US005239459A

United States Patent [19]

Hunt et al.

[11] Patent Number: 5,239,459

[45] Date of Patent: Aug. 24, 1993

[54] AUTOMATED ASSESSMENT PROCESSOR FOR PHYSICAL SECURITY SYSTEM

[75] Inventors: Allan Hunt; Corey Anderson, both of Santa Barbara; Ann Sanders, Isla Vista, all of Calif.

[73] Assignee: General Research Corporation, Vienna, Va.

[21] Appl. No.: 475,262

[22] Filed: Feb. 5, 1990

[51] Int. Cl.[5] .............................................. G06F 15/21

[52] U.S. Cl. .............................. 364/400; 340/825.32; 340/514

[58] Field of Search .............................. 364/400, 409; 340/825.32, 825.54, 505, 514, 515, 581

[56] References Cited

U.S. PATENT DOCUMENTS

| | | | |
|---|---|---|---|
| 3,978,479 | 8/1976 | Schmitz | 340/502 |
| 4,006,460 | 2/1977 | Hewitt et al. | 340/511 |
| 4,103,293 | 7/1978 | La Forge, Jr. | 340/514 |
| 4,124,848 | 11/1978 | Clark et al. | 340/524 |
| 4,141,006 | 2/1979 | Braxton | 340/505 |
| 4,166,273 | 8/1979 | Riley, Jr. et al. | 340/539 |
| 4,213,183 | 7/1980 | Barron et al. | 364/507 |
| 4,321,592 | 3/1982 | Crandall et al. | 340/541 |
| 4,382,291 | 5/1983 | Nakauchi | 367/93 |
| 4,401,976 | 8/1983 | Stadelmayr | 340/522 |
| 4,602,246 | 7/1986 | Jensen | 340/521 |
| 4,613,848 | 9/1986 | Watkins | 340/541 |
| 4,660,024 | 4/1987 | McMaster | 340/522 |
| 4,706,069 | 11/1987 | Tom et al. | 340/541 |
| 4,764,755 | 8/1988 | Pedtke et al. | 340/541 |
| 4,782,330 | 11/1988 | Tindall et al. | 340/541 |
| 4,796,012 | 1/1989 | Schechter et al. | 340/551 |
| 4,808,972 | 2/1989 | Nichols | 340/541 |
| 5,051,723 | 9/1991 | Long et al. | 340/566 |

OTHER PUBLICATIONS

Bartek, Richard J. and Booker, Iris J., "Selection of a Robust Set of Signature Features for a Multi-Sensor Perimeter Intrusion Detection System", Proceedings of the 1986 Carnahan Conference on Security Technology, May 1986.

Hunt, A.R. et al., "Development of a Distributed, Adaptive, Intrusion Detection System: Hardware and Software Operation", Proceedings of the 1983 Carnahan Conference on Crime Counter-measures and Security, May 1983.

Sanders, Ann H. et al., "A Data Acquisition System for Physical Security" Proceedings of the 1986 Carnahan Conference on Security Technology, May 1986.

Hunt, A.R. and Kline, F.J., "Development of a Distributed, Adaptive, Intrusion Detection System; Field Test Results", Proceedings of the 1984 Carnahan Conference on Security Technology, May 1984.

(List continued on next page.)

*Primary Examiner*—Robert A. Weinhardt
*Assistant Examiner*—Gita D. Shingala
*Attorney, Agent, or Firm*—Nixon & Vanderhye

[57] ABSTRACT

A modular processor unit, known as an ASP unit (50), is provided for intelligently enhancing a conventional physical security system (20) without significant reconfiguration. The unit (50) is installable between conventional sensors (30) and a conventional transponder (28), the transponder being in communication with a central control station (22) of the system. The ASP unit (50) analyzes, over a period of time, a plurality of preselected features of the signal received from said sensor and used the features to evaluate a polynomial and thereby classify an event as an intrusion or a nuisance. The ASP unit (50) further includes an output state simulation relay switch (72) responsive to the classification for simulating an element of the sensor (30) and for providing an output state to the transponder (28). In one embodiment, the ASP unit (50) is connected by an ASP communications network (52) to a retraining workstation (54). Upon installation of the ASP unit (50) or modification of sensors, the retraining workstation (54) can be used to download both sensor-related and classifier-related parameters to the ASP unit.

22 Claims, 17 Drawing Sheets

OTHER PUBLICATIONS

Lapman, Gary B. and Carrig, James E., "Archiving and Retraining Tradeoffs for a Perimeter Intrusion Detection System", Second Annual Joint Government-Industry Symposium on Security Technology, American Defense Preparedness Association Jun. 1986.

Sanders, Ann H., "Laboratory and Field Test Results for a Multi-Node Intrusion Tetection System", 1986 ADPA Symposium on Security Technology, Jun. 1986.

Bartek, Richard J., and Tanner, Melissa Bartholomew, "Multi-Sensor Signal Processing Architecture for a Perimenter Intrusion Detection System", Proceedings of the 1986 Carnahan Conference on Security Technology, May 1986.

Hunt, A.R., "Performance simulation of a Local Area Network For Real Tiem, Distributed Data Processing", Phoenix Conference on Computers and Communications, Mar. 1983.

Sanders, Ann H. and Bartek, Richard J., "Final Testing of a Multi-Sensor Perimeter Intrusion Detection System", Proceedings of the 1986 Carnahan Conference on Security Technology, May 1986.

Kline, F.S. et al., "Development of a Distributed, Adaptive, Intrusion Detection System: Algorithm Operation Performance Countermeasures and Security", May 1983.

AUTOMATED ASSESSMENT PROCESSOR FOR PHYSICAL SECURITY SYSTEM

BACKGROUND

I. Field of the Invention

This invention pertains to physical security systems such as perimeter intrusion detection systems, and particularly to an intelligent processor unit suitable for use with conventional sensors in a physical security system, and a method for operating such a processor unit.

II. Prior Art and other Considerations

In general, physical security systems include sensors which monitor an associated area or zone. When a sensor detects activity within its zone, the sensor changes its output state, which in turn can result in activation of an alarm. Such sensors are utilized to detect intrusions that compromise security of the monitored premises, such as a military installation or an industrial facility. Some of the activity detected by security sensors does not necessarily compromise the security of monitored premises, such as background noise, noisy weather conditions, or perimeter-penetrating roamings of animals, for example. An event which does not compromise security, but which nevertheless is detectable by sensors, is generally referred to as a "nuisance".

When alarms are frequently activated by nuisances, one of two scenarios often develop. In some situations, human security guards monitoring the alarms become dulled and inattentive, with the result that security becomes lax. In other situations, each nuisance alarm condition is investigated, requiring inordinate effort.

Sometimes sensors do not properly detect an intrusion, resulting in a "missed detection". Such can occur, for example, when equipment at a physical security system is misadjusted in hopes of reducing the number of nuisance alarms.

Physical security systems are typically evaluated by plotting the probability of detection of the system against its probability of nuisance alarm. The resulting curve, known as the receiver operating curve or "ROC" curve, reflects the efficiency of the security system. An efficient physical security system has a high probably of detection and a low probability of nuisance alarm.

Applicants have previously proposed an efficient intrusion detection system for monitoring a plurality of monitored areas or phenomenology zones. The previously proposed system comprised a local area network (LAN) which linked together three types of nodes: a basic signal processing node; an enhanced node; and, a display and control node. The basic node monitored a set of sensors, performed signal conditioning and certain signal processing, and sent partially processed data to an enhanced node via the LAN. In one configuration of the proposed system, a basic node was provided at each sensor zone, there being a plurality of sensors in the overall system. Each enhanced node served several basic nodes by performing more detailed signal processing and making classification decisions (e.g., whether an alarm should be activated with respect to a certain zone). When an alarm was determined to have occurred, the enhanced node sent information to the display and control node which displayed the alarm and prompted security personnel for further actions.

When an event, such as an intrusion or a nuisance, occurred in the system previously proposed by Applicants, the basic node detecting the event applied data to the LAN at quarter second intervals. The enhanced nodes included a plurality of classifier networks, including a permanently programmed "switch" classifier and one or more retrainable branch classifiers. The switch classifiers were utilized to determine the existence of abnormal conditions, such as bad weather or heavy background noise, and to direct processing to a branch classifier suitably pre-programmed for making classifications under the abnormal condition. The classifiers used data-extracted "features" occurring over the last second of time as input to their polynomials for obtaining a classifier output value. The classifier output value was compared to a threshold value to determine if an event was an intruder or a nuisance.

The classifiers included in Applicants' previous system were reprogrammable or retrainable to reflect newly learned truth. In this respect, data associated with an event was archived at the control node. If an event were incorrectly classified as an intrusion rather than a nuisance, "ground truth" for properly classifying the event could later be input to the archiving area of the control node. Subsequently, the archived data was transferred to a separate workstation which developed new classifiers for the enhanced node. These new classifiers were then downloaded to the enhanced node via the LAN.

Most existing security conscious facilities have, at considerable costs, already installed basic security systems. Conventional security systems typically include one or more sensors associated with each of a plurality zones. Examples of such sensors include fence monitors (such as taut wire devices); magnetic seismic sensors (i.e., "MILES"); geophones, microwaves sensors ("RACON"); and ported coax cables ("SENTRAX"). These sensors generally have a relay closure which changes state (e.g., opens) when the sensor detects an event. When a transponder associated with a sensor detects a change of state of the relay closure, the transponder sends a signal to a central monitoring station.

Facilities having conventional security systems comprising sensor relay closures and transponders are generally inefficient. The environment surrounding these conventional sensors cannot be controlled, and the sensors cannot adapt for changing environment or background conditions. But with considerable capital investment in their existing conventional security systems, these facilities are not prone to dismantle their existing systems for replacement by more advanced systems, including the LAN-based intelligent system previously proposed by Applicants. Nevertheless, such facilities would greatly benefit from enhanced intrusion/nuisance discrimination.

Therefore, it is an object of this invention to provide apparatus for intelligently enhancing conventional physical security systems and method for operating the same.

An advantage of the present invention is the provision of a modular unit for intelligently enhancing conventional physical security systems.

Another advantage of the present invention is the provision of a retrainable unit for intelligently enhancing conventional physical security systems and method for operating the same.

Yet another advantage of the present invention is the provision of a remotely configurable unit for intelligently enhancing conventional physical security systems and method for operating the same.

Still another advantage of the present invention is the provision of a unit for intelligently enhancing conventional physical security systems which can function independently of other aspects of the physical security system.

Another advantage of the present invention is the provision of a unit for intelligently enhancing conventional physical security systems which is capable of archiving data descriptive of events occurring in a zone associated with the unit.

SUMMARY OF THE INVENTION

A modular processor unit, known as an ASP unit, is provided for intelligently enhancing a conventional physical security system. Such conventional physical security systems include a central security computer which communicates with a plurality of transponders over a communications network. Each transponder receives digital output signals from at least one sensor. The modular ASP unit of the invention is installable between conventional sensors and a conventional transponder for intelligently enhancing the physical security system without significantly reconfiguring the physical security system.

Each modular ASP unit has a bank of filters for receiving an analog signal from each of the sensors connected thereto. The filtered analog signals are multiplexed through an analog-to-digital conversion section so that digital values can be obtained. Digital data is collected and stored in memory for the sensors in each monitored zone for intervals of 0.25 second. At the end of each 0.25 second interval, for a previous 1 second epoch "features" are extracted from the stored digital data for the sensors in a zone. In the illustrated embodiment, the extracted features for each sensor in a monitored zone include the maximum value detected during an interval, the minimum value, the mean value, and the variance (i.e., the square of the standard deviation). Each feature is averaged with values previously collected for the same feature over the three preceding intervals. The averaged features are then submitted to a system of classifier ALN networks.

Each system of classification networks is configured to ultimately produce a numerical result which will indicate whether a monitored event is an intrusion or a nuisance. Each system of classification networks comprises a plurality of classifier ALNs (adaptive learning networks). The classifier ALNs comprise polynomials which are evaluated based on the values of downloaded coefficients and the normalized features. Two basic types of classifier ALNs are included in each system of classification networks—switch classifier ALNs and branch classifier ALNs. The switch classifier ALNs are utilized to determine which of the branch classifier ALNs should ultimately make the decision as to whether a monitored event is an intrusion or a nuisance. A first type of switch classifier ALN is a "weather" switch ALN which is used to determine whether the sensor signals were obtained during a period of bad weather. A second type of switch ALN is a "background" ALN which determines whether the sensor signals were obtained during a period of high background noise. The evaluation of the weather and background switch ALNs determines which branch ALN makes the decision as to whether the sensor signals indicate the occurrence of a nuisance or an intrusion.

The ASP unit has an ASP closure relay that simulates the alarm closure relay of the conventional sensor. However, the ASP unit substitutes its own ASP closure relay for the relay of the conventional sensor, thereby imitating the alarm closure relay of the conventional sensor. The conventional transponder is induced to rely upon the output state of the ASP closure relay, which reflects the intelligent analysis of the classifer ALNs, rather than the basic sensor signal.

In one embodiment, the ASP unit is connected by an ASP communications network to a retraining workstation. The ASP unit gathers retraining/diagnostic information regarding its monitored events and either communicates the same to a retraining workstation or archives the information for eventual retraining. The retraining workstation can utilize the data to develop and download even more sophisticated classification networks for the ASP, thereby further enhancing the intelligence of the ASP unit.

Upon installation of the ASP unit or modification of sensors, the retraining workstation can be used to download both sensor-related and classifier-related parameters to the ASP unit. Included among the sensor-related parameters downloaded to the ASP unit are the ADC sampling frequencies for the sensors connected to the ASP unit and the filtering frequency cutoff for the sensors connected to the ASP unit.

As part of the configuration sent to the ASP by the retraining workstation, the specific relay closures for specific ALNs are set up. The ASP unit can operate with one sensor per ALN and relay, two sensors per ALN, three sensors per ALN, or 4 sensors per ALN, or even any combination of these configurations. The combinations are set by a configuration message at the time of set up.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various view. The drawings are not necessarily to scale, emphasis instead being placed upon illustrating the principles of the invention.

DETAILED DESCRIPTION OF THE DRAWINGS

Figure 1:
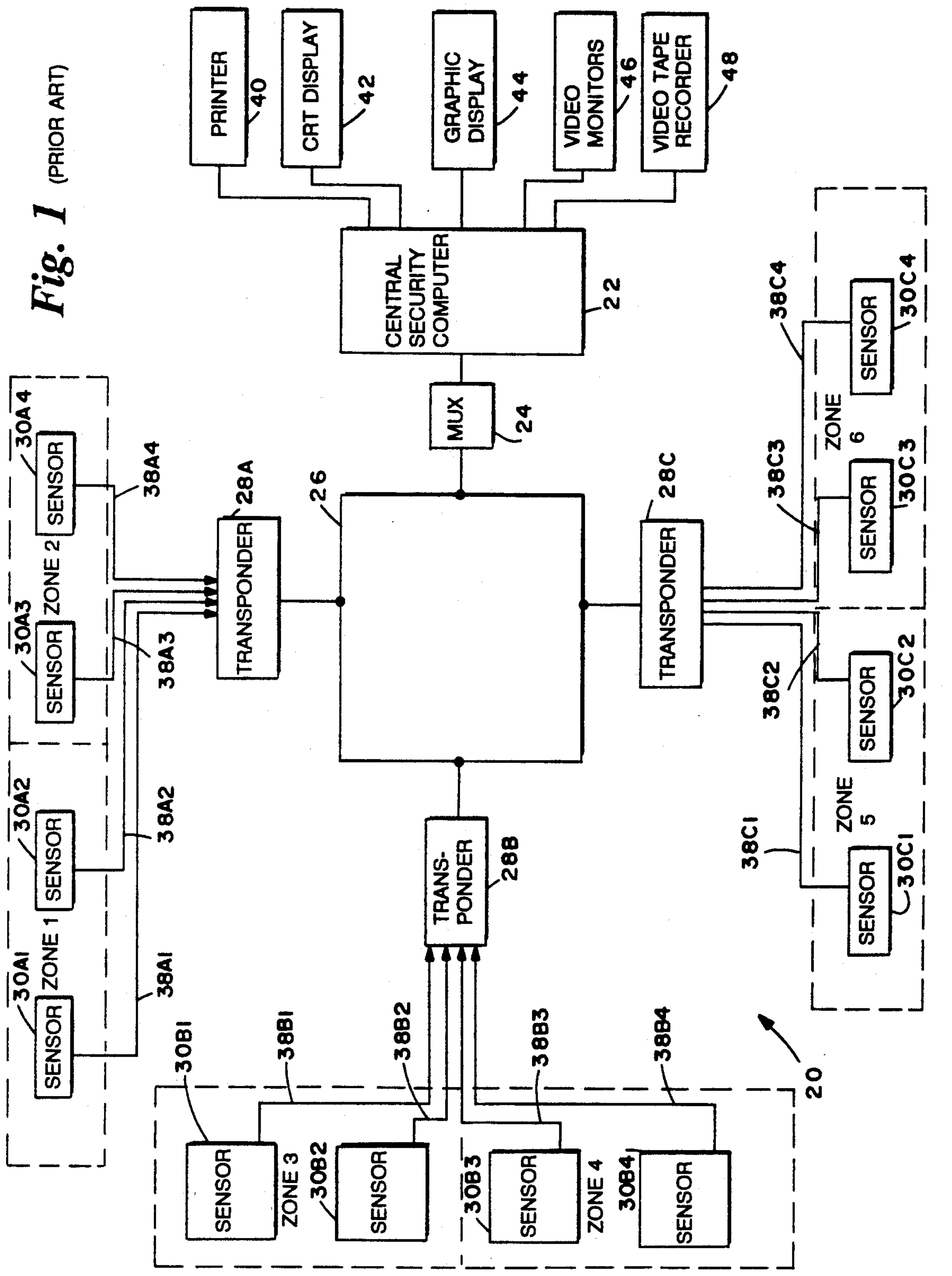
Fig. 1 (PRIOR ART)
FIG. 1 is a schematic view of a prior art physical security system.

FIG. 1 illustrates a conventional prior art physical security system 20. Security system 20 includes a central security computer 22 which is connected by a multiplexer interface 24 to a communications network 26. The multiplexer interface 24 and the communications network 26 enable the central security computer 22 to communicate with a plurality of transponders, such as transponders 28A, 28B, and 28C shown in FIG. 1. Each transponder 28 is connected to a plurality of sensors 30. FIG. 1 shows four sensors 30 connected to each transponder 28. For example, sensors 30A1, 30A2, 30A3, and 30A4 are connected to transponder 28A; sensors 30B1, 30B2, 30B3, and 30B4 are connected to transponder 28B, and so forth.

Figure 1A:
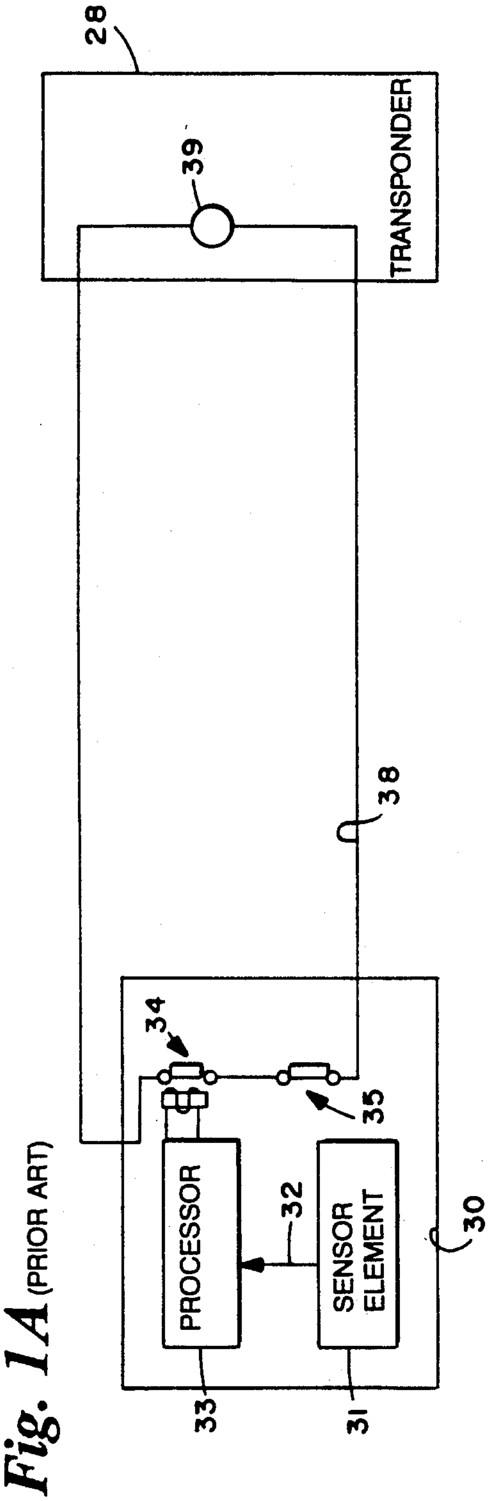
Fig. 1A (PRIOR ART)
FIG. 1A is a schematic view showing the connection of a conventional sensor to a conventional transponder according to the prior art.

As shown in FIG. 1A, each sensor 30 includes a sensor element 31 which produces a sensor analog output signal on line 32. The signal on line 32 is applied to the sensor's signal processor 33, which conditions the analog signal. The sensor 30 also includes two closure relays, in particular an alarm closure relay 34 and a tamper closure relay 35. The closure relays 34 and 35 are connected in series in a monitored looped line 38. A monitoring device 39 in the transponder 28 monitors the status of the signal on the line 38, and hence the state of the closure relays 34 and 35.

Typically, absent the detection of an event by the sensor element 31, the conditioned circuit from the processor 33 keeps the alarm relay closure 34 in a "closed" position or state. The tamper relay closure 35 is likewise maintained in a "closed" position unless someone tampers with the sensor housing. The monitoring device 39 in transponder 28 expects to read a certain voltage and/or current in the line 38 under these normal conditions. However, if either closure relay 34 or 35 opens, the monitoring device 39 will detect an opened circuit, with the result that the transponder 28 will apply an alarm signal to the communications network 26 to the central security computer 22.

Upon receiving an event signal from a transponder 28, the central security computer 22 sends appropriate signals to the peripheral equipment connected to computer 22. The particular central security computer 22 shown in FIG. 1 has connected thereto a printer 40; a CRT display 42; a graphic display 44; a video monitor 46; and, a video tape recorder 48.

The premises monitored by the physical security system 20 of FIG. 1 includes six detection zones, shown (framed by broken lines as zone 1 through zone 6 in FIG. 1. Each zone is monitored by two sensors 30. For example, zone 1 is monitored by sensors 30A1 and 30A2; zone 2 is monitored by sensors 30A3 and 30A4; zone 3 is monitored by sensors 30B1 and 30B2, and so forth. It should be understood that the depiction of three zones in FIG. 1 is merely illustrative, and that for other premises more or less zones may exist. Moreover, more or less sensors may be provided per zone.

The sensors 30 shown in FIG. 1 can be of any conventional type. One type of sensor is a magnetically and seismically active sensor (commonly referred to as "MAIDS-MILES") which generates an alarm when there is a local disturbance in the sensor's magnetic field produced by movements of a ferrous material over or near a transducer cable, or in response to cable displacements in the seismic environment. Another type of sensor is a noisy coaxial cable that senses vibrations of chain-link fencing. Another sensor type is a buried-line leaky cable comprising a transmitter module, a cable set, and a control module. Still other types of sensors include electrostatic field motion detectors, microwave sensors, and geophones. For the purpose of the present discussion, however, it will be assumed that there are two types of sensors per zone: a microwave sensor (such as sensor 30A1 in Zone 1) and a ported coax sensor (such as sensor 30A2 in Zone 1).

Figure 2A:
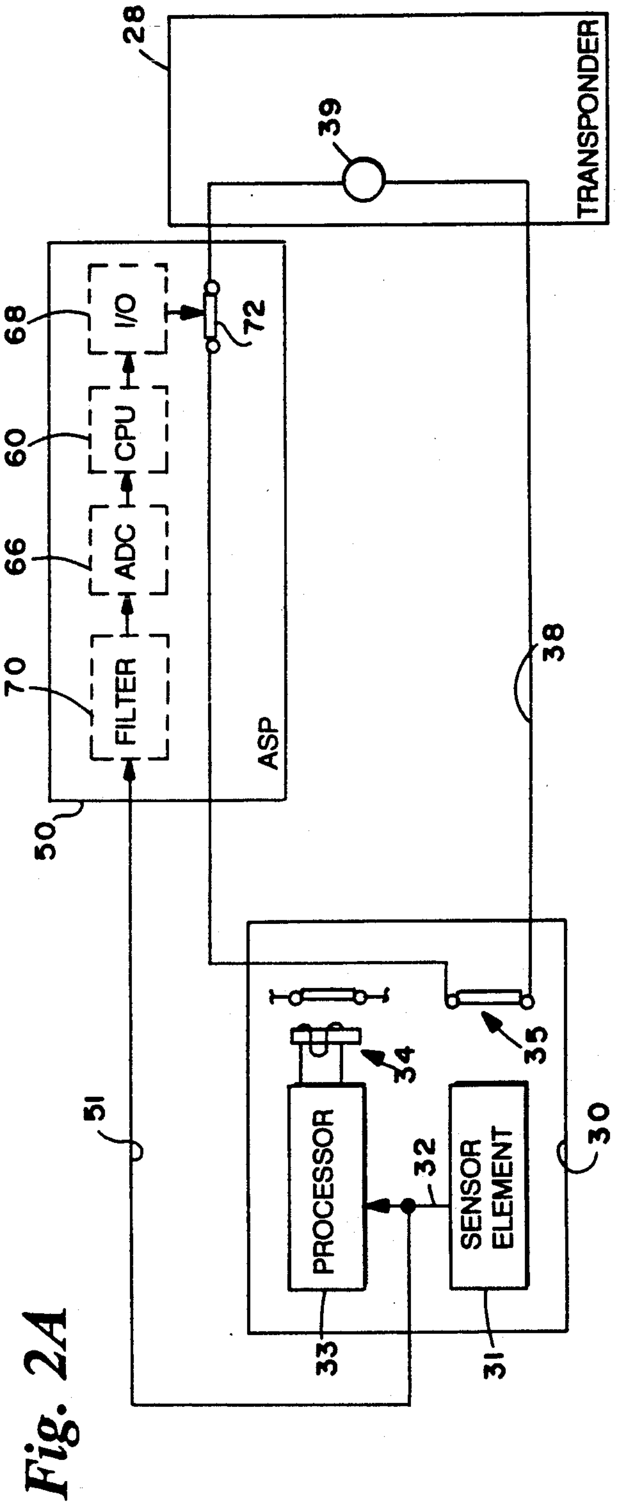
FIG. 2A is a schematic view showing the connection of a enhancement processor unit between a conventional sensor and a conventional transponder.
Figure 2:
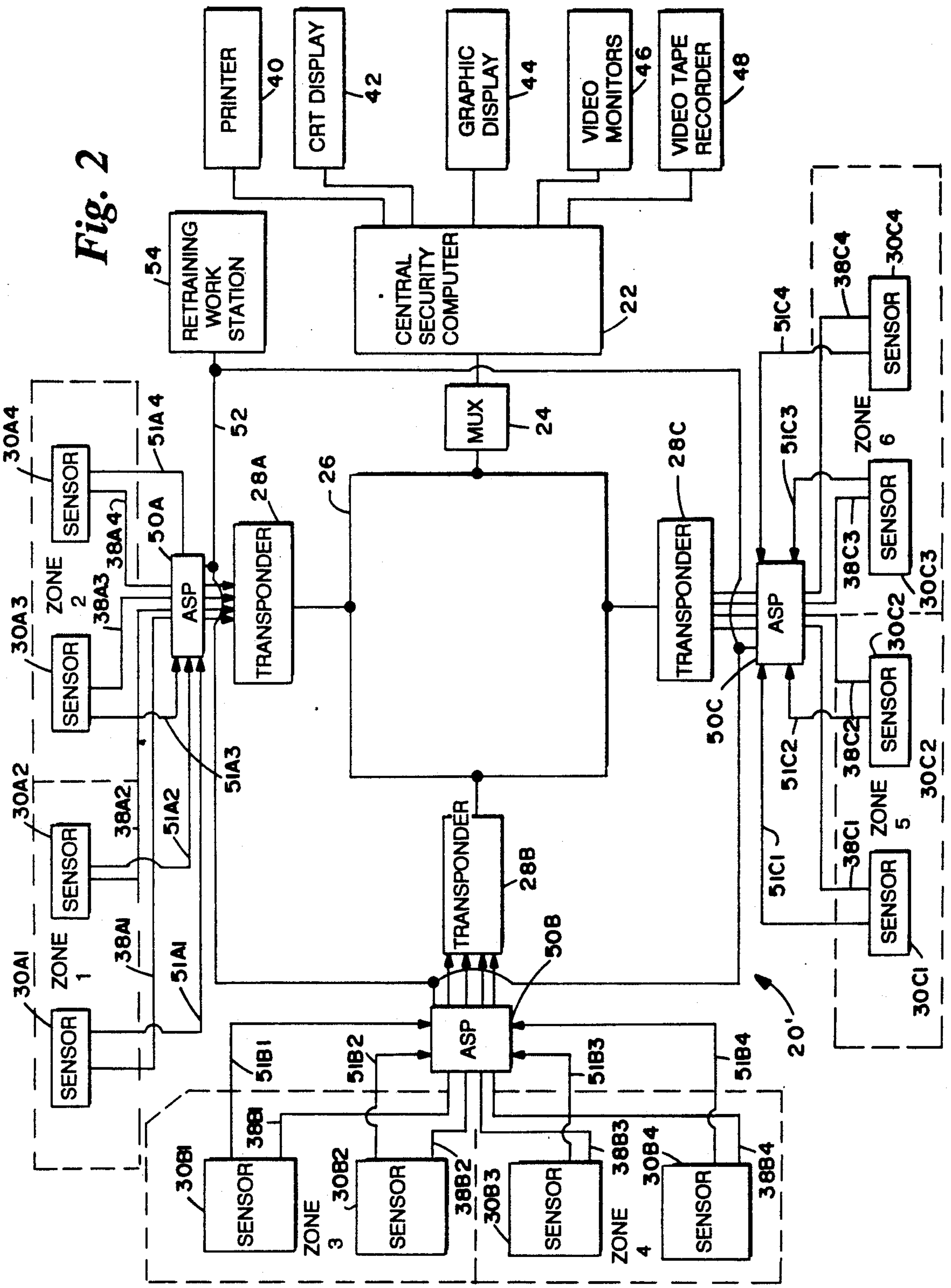
FIG. 2 is a schematic view of an intelligently enhanced physical security system according to an embodiment of the invention.

FIGS. 2 and 2A illustrate how the physical security system 20 of FIG. 1 can be enhanced to become an intelligent physical security system 20'. The enhancement is implemented by inserting an enhancement processing unit 50, also known as an "ASP" (Automated Assessment Signal Processor), between each set of the conventional sensors 30 and their associated conventional transponder 28. For example, ASP 50A is inserted between sensors 30A1, 30A2, 30A3, 30A4 and transponder 28A. For the particular facility shown in FIG. 2, only three ASP units (namely units 50A, 50B, and 50C) are required, one for each transponder. It will be understood that in other facilities the number of ASP units 50 will differ, with the number of ASP units 50 equaling one-quarter the number of sensors 30 provided at the facility.

As shown in FIG. 2A, each ASP 50 is connected to analog output line 32 of its associated sensor 30 by line 51. In addition, as described hereinafter, a closure relay of the ASP 50 is connected in series with the tamper closure relay 35 of the sensor on line 38. The sensor closure relay 34 is taken out of the circuit of loop line 38.

In the embodiment of FIG. 2, the ASPs 50A, 50B, 50C are each connected via an ASP communications network 52 to an ASP retraining workstation 54. The nature of the ASP communications network 52, and the ASP retraining workstation 54, will be understood in the development of the ensuing description, including the description of FIG. 8.

Figure 3A:
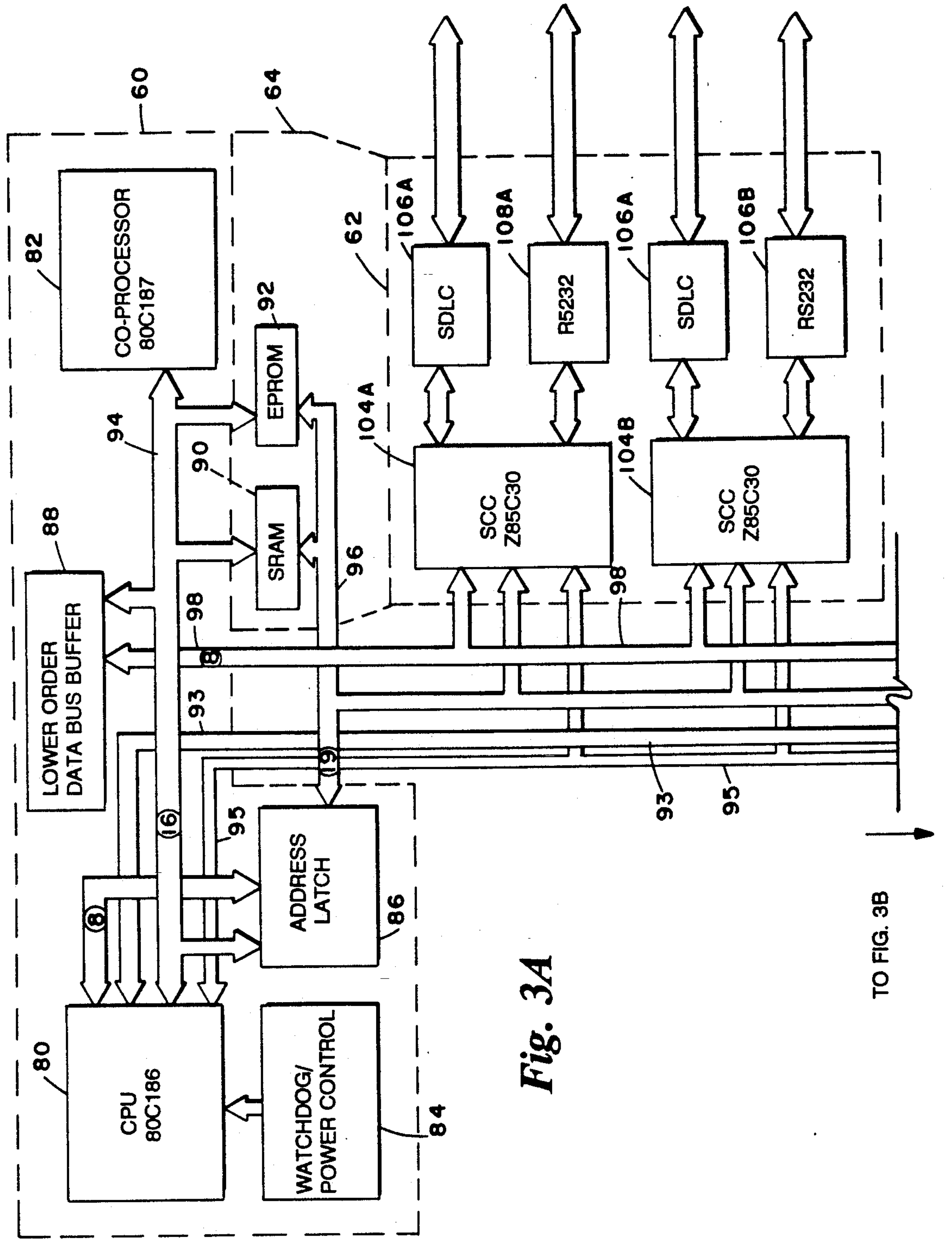
FIGS. 3A and 3B are schematic views of an enhancement processor unit according to the embodiment of FIG. 2.
Figure 3B:
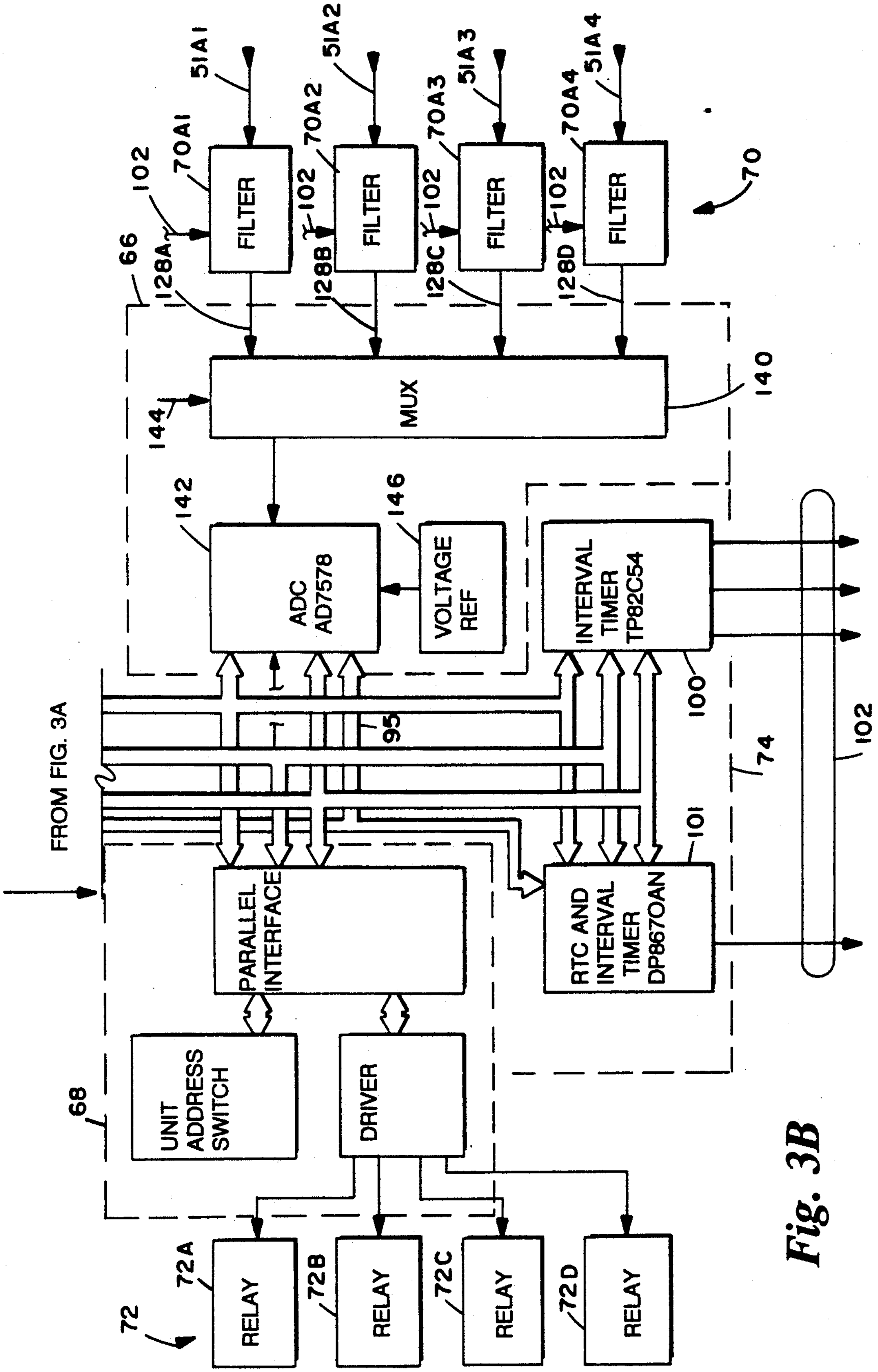

FIGS. 3A and 3B together constitute a schematic view of an ASP 50 of the embodiment of FIG. 2. As shown in FIGS. 3A and 3B, the ASP 50 comprises a processing section (framed by broken line 60); a serial communications section (framed by broken line 62); a memory section 64; an analog-to-digital conversion (ADC) section 66; a peripheral parallel interface section (framed by broken line 68); a bank of filter circuits 70; a bank of relay switches 72; and, an interval timer section (framed by broken line 74).

Figure 5A:
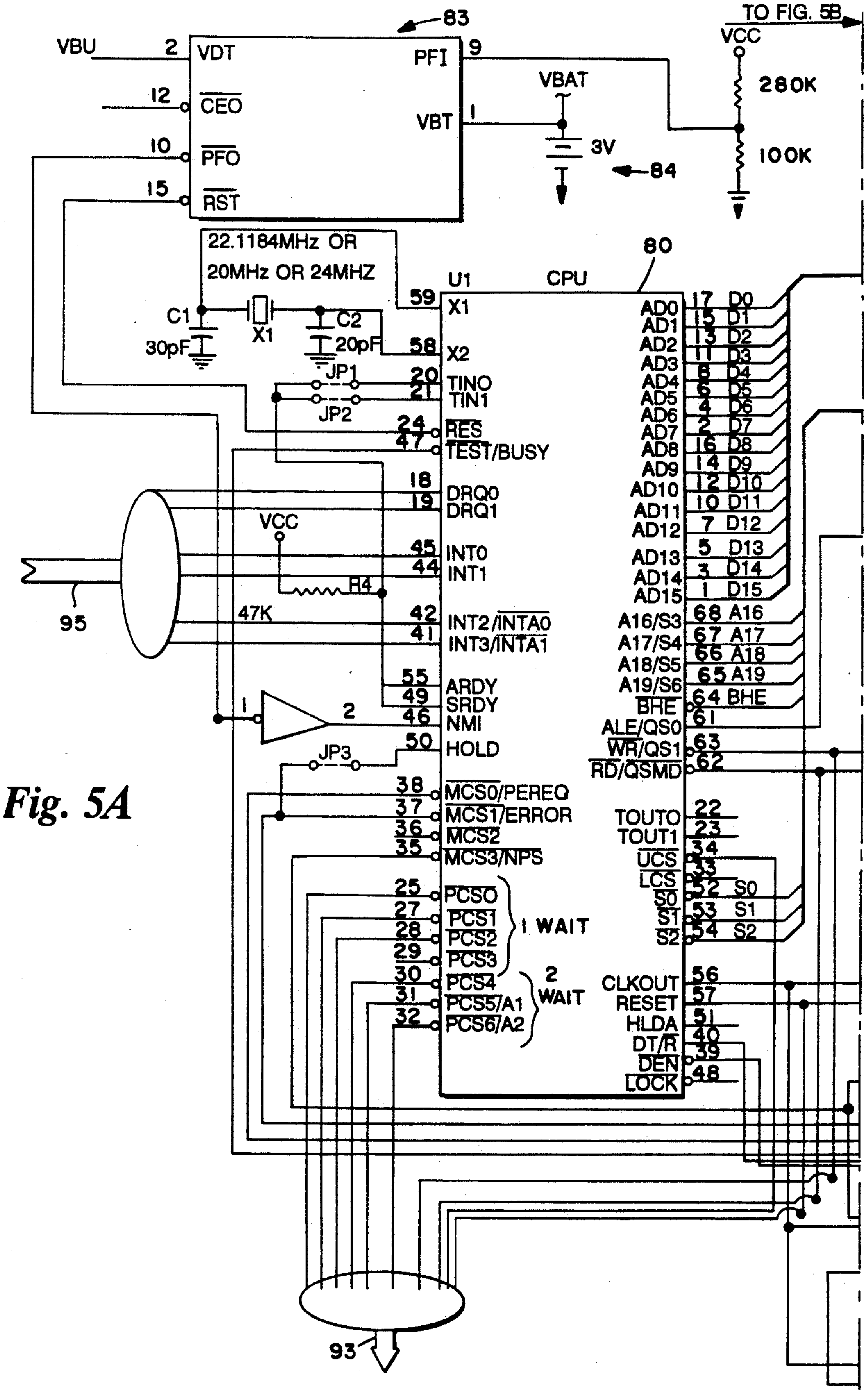
FIGS. 5A and 5B are detailed schematic views of a processing section of the enhancement processor unit of the embodiment of FIG. 3.
Figure 5B:
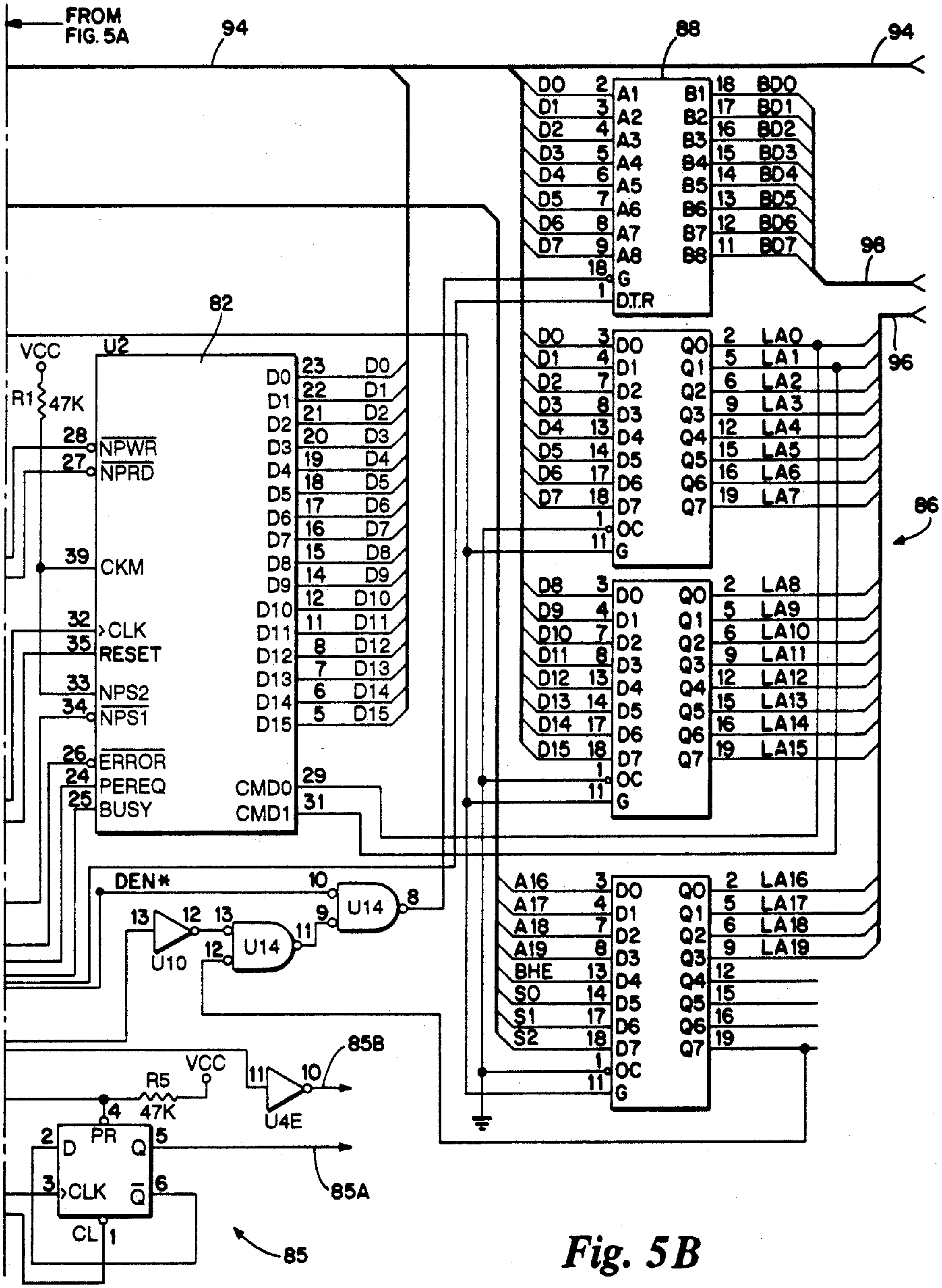

The processing section 60, shown in more detail in FIGS. 5A and 5B, comprises a central processing unit (CPU) 80; a numeric co-processor unit 82; a watchdog/power control circuit 83 (including battery 84); a timer flip-flop 85; a bank 86 of three address latches; and, a lower order data bus buffer 88. In the illustrated embodiment, the CPU 80 is a 16-bit Intel 80C186 CMOS processor while the co-processor 82 is an Intel 80C187 CMOS floating point numeric co-processor. The memory section 64 includes a bank 90 of eight static random access memory (SRAM) chips and a bank 92 of two erasable programmable read only memory (EPROM) chips. The SRAM bank 90 includes four pairs of SRAMs; the EPROM bank 92 includes one pair of EPROMs. Thus, in the illustrated embodiment, the ASP 50 includes 1024 bytes of SRAM (using 128K×8 SRAM chips) and up to 128K bytes of EPROM. The SRAM bank 90 is backed up by the three volt battery 84 of the watchdog circuit 83.

Various pins of the CPU 80 have leads connected to a chip select and control bus 93. These pins include pins 25 and 27–32 of the CPU 80, which are used for chip select purposes; reset pin 57; and, the inverted read and inverted write pins (pins 62 and 63, respectively).

The CPU 80 and the co-processor 82 have their data pins connected by a 16-bit data bus 94. The data bus 94 also connects to the SRAM bank 90 and to the EPROM bank 92, with the eight lower order bits of bus 94 connected to a lower order SRAM chip and a lower order EPROM chip in each pair, and the eight higher order bits of bus 94 connected to a higher order SRAM chip and a higher order EPROM chip in each pair. The data bus 94 also connects to the bank 86 of address latches in the manner shown in FIGS. 5A and 5B. A lower order eight bits of the data bus 94 connects to the lower order data bus buffer 88, also as shown in FIGS. 5A and 5B.

As described hereinafter, on a bus 95 (known as direct memory access request and interrupt bus 95) the CPU 80 receives interrupts from the ADC section 66; receives interrupts from the serial communications section 62; receives interrupts from the real time clock/interval timer 101; and receives direct memory access requests from the serial communications section 62.

A 20-bit address bus 96 is provided, with the least significant bit of the bus 20 being used as a byte select bit. The address bus 96 extends from the bank 86 of address latches for connection to the SRAM 90; to the EPROM 92; to the serial communications section 62; to the interval timer section 74; to the ADC section 66 (lowest order bit); and, to the peripheral parallel interface section 68 (lowest two order bits). From the lower order data bus buffer 88 an eight bit data bus 98 (the lowest eight order bits from data bus 94) extends for connection to the serial communications section 62; to the ADC section 66; to the peripheral parallel interface section 68; and, to the interval timer section 74.

The interval timer section 74 of the ASP 50 includes two programmable timer devices, particularly programmable interval timer 100 and real time clock (RTC) & interval timer 101. In the illustrated embodiment, timer 100 bears part number TP82C54 and timer 101 bears part number DP8570AN. The interval timer 100 includes three timers that function as three separate square wave pulse generators; the interval timer 101 includes one timer that functions as a fourth square wave generator. An output pin of each of the four square wave generators is connected to a corresponding lead in a FCLK bus 102 which carries a signal for application to a corresponding one of the filters circuits included in filter bank 70.

The two interval timers 100 and 101 have their eight data pins connected to the data bus 98. Both interval timers 100 and 101 have their chip select pins and their inverted read and inverted write pins connected to the chip select and control bus 93. The two address pins of the interval timer 100 are connected to lines LA1 and LA2 in the address bus 95; the five address pins of the interval timer 101 are connected to lines LA1–LA5 in the address bus 95. In addition, the real time clock of the RTC & interval timer 101 is connected to the watchdog circuit 83 and to the battery in the watchdog circuit 83.

As seen hereinafter, the individual timers comprising the interval timers 100 and 101 can be programmed so that each square wave generator will produce a square wave pulse at a frequency uniquely programmed for that generator. In this regard, the timers 100 and 101 are programmed by writing to internal registers in the timer chips. This writing is done when a proper signal is applied to write enable and chip select pins of the timers 100 and 101. The value of the address appearing at the address pins of the timer determines which chip and which internal register is being programmed. The value appearing on the data bus 98 at the time of the chip select and write enable signals determines the value loaded into these internal registers. The data loaded into these registers select the operating mode of the counter (i.e., squarewave output) and the frequencies of the waveforms. Several registers are loaded in this manner to program the timer chips 100 and 101. Accordingly, to program a particular square wave generator, when the write enable and chip select pins are enabled, the CPU 80 places an address on the address bus 95 indicative of that particular timer and a value on the data bus 98 corresponding to the frequency at which that particular timer is to generate pulses.

The serial communications section 62 includes two serial communications controllers 104A and 104B capable of bit oriented communications. Each controller 104 supports two serial communications channels: an SDLC channel 106 and an RS-232 channel 108. That is, controller 104A supports SDLC channel 106A and RS-232 channel 108A, while controller 104B supports SDLC channel 106B and RS-232 channel 108B. In the illustrated embodiment, the serial communications controllers 104A and 104B are AMD Z88C30 controllers.

Figure 6A:
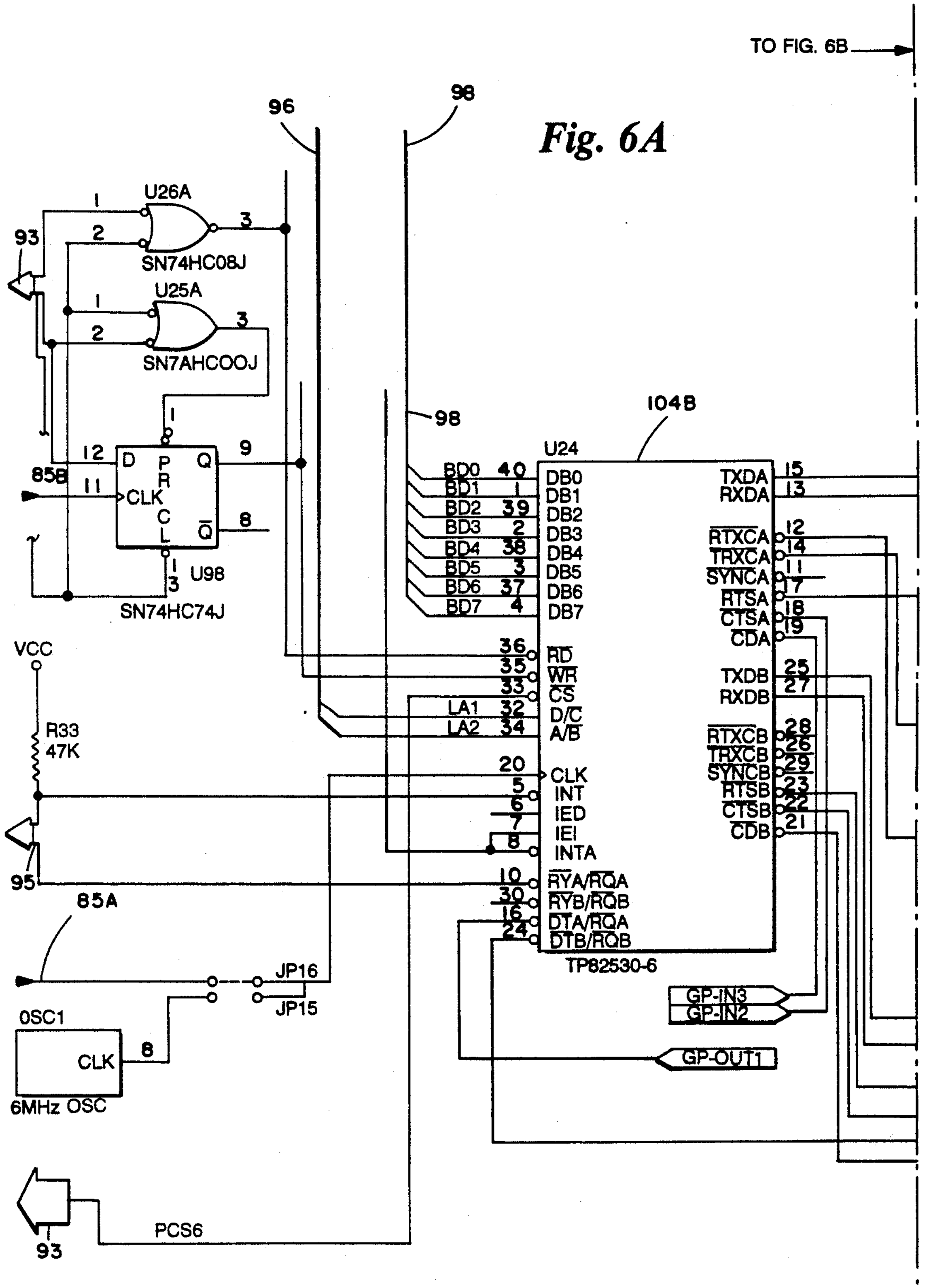
FIGS. 6A and 6B are detailed schematic views of a serial communications section of the enhancement processor unit of the embodiment of FIG. 3.
Figure 6B:
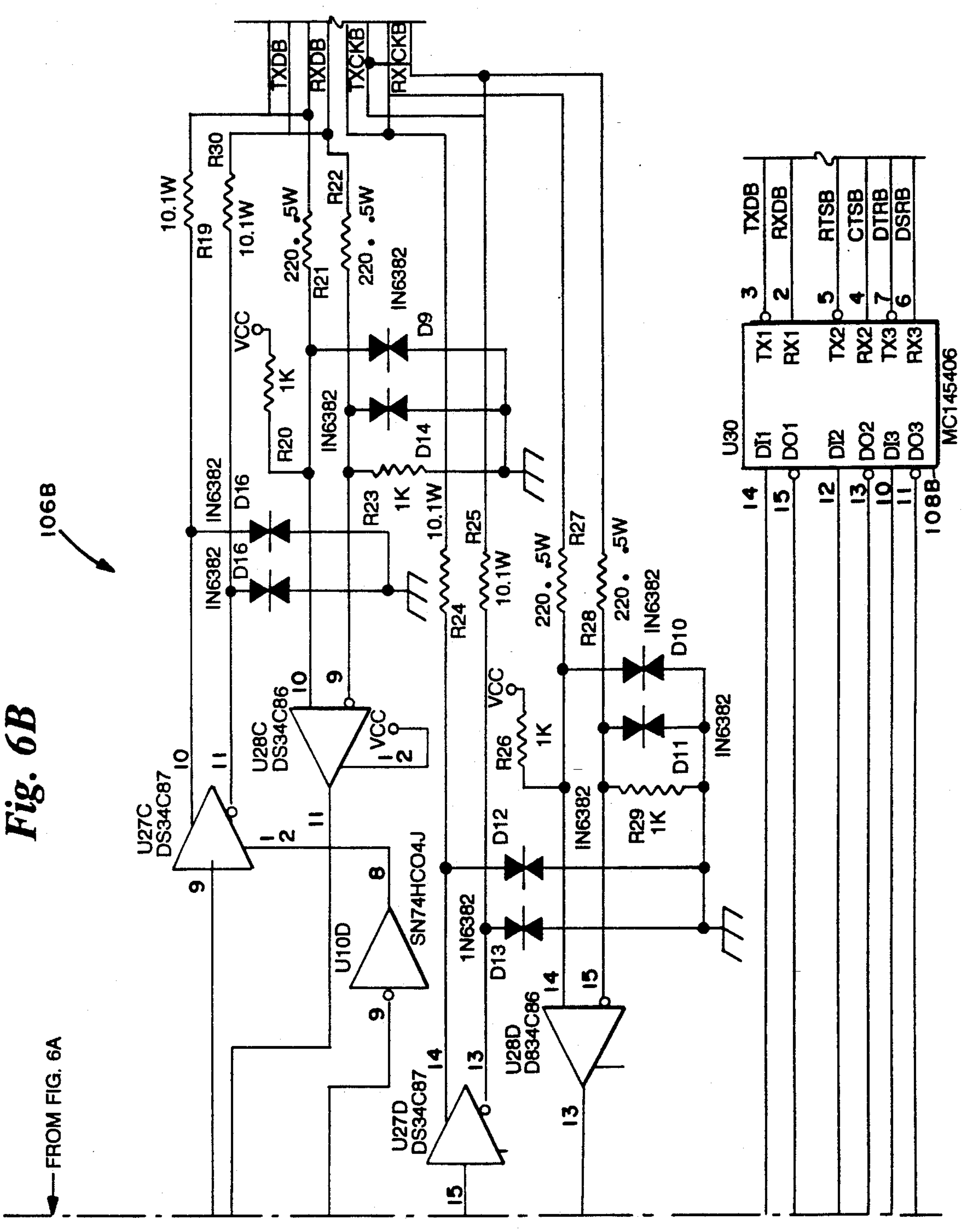

One of the serial communication controllers, particularly controller 104B, and its associated SDLC channel 106B and RS-232 channel 108B, are shown in greater detail in FIGS. 6A and 6B. The SDLC channel uses an RS-422/485 driver and an RS-422/485 receiver (part numbers 75174 and 75175, respectively) to connect to the ASP communications network 52 in the manner shown in FIG. 8.

As shown in FIG. 2 in conjunction with FIG. 2A, an analog signal from line 32 of each sensor 30 is applied on an associated line 51 to as ADP 50. For example, the analog signal from line 32 of sensor 30A1 is applied on line 51A1 to the ASP 50A; the analog signal from sensor 30A2 is applied on line 51A2 to the ASP 50A; the analog signal from sensor 30A3 is applied on line 51A3 to the ASP 50A; and, the analog signal from sensor 30A4 is applied on line 51A4 to the ASP 50A.

The ensuing discussion describes the ASP 50 of FIGS. 3A and 3B as being the ASP 50A of FIG. 2, which receives analog signals from the sensors 30A1, 30A2, 30A3, and 30A4 on the respective lines 51A1, 51A2, 51A3, and 51A4 in the manner previously described. Each of the sensors 30 is connected in one-to-one correspondence with one of the filter circuits included in bank 70. That is, sensor 30A1 in connected by line 51A1 to filter circuit 70A1; sensor 30A2 in connected by line 51A2 to filter circuit 70A2; and so forth.

Figure 4:
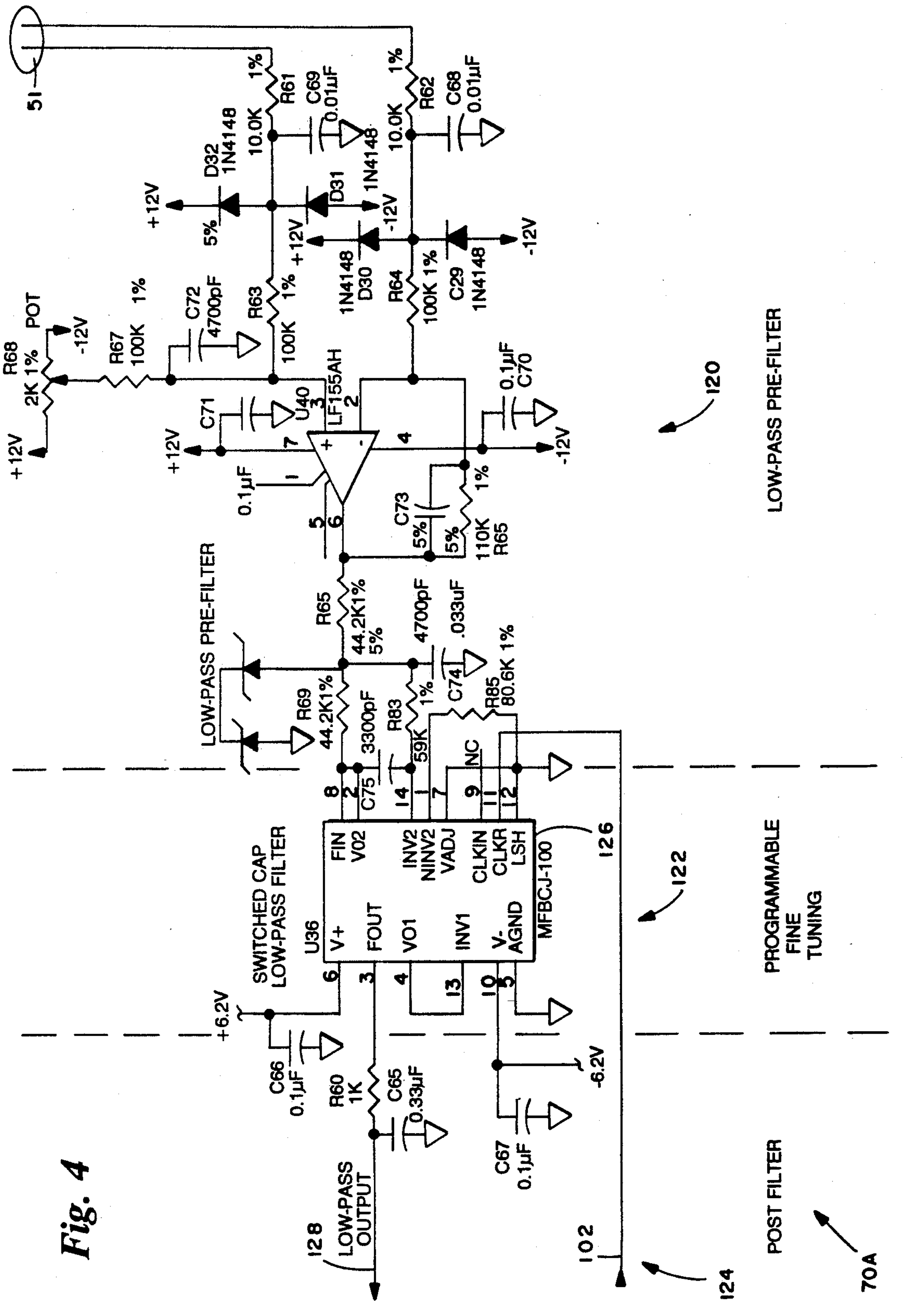
FIG. 4 is a detailed schematic view of a sensor analog signal filter circuit according to the embodiment of FIG. 3.

FIG. 4 illustrates an exemplary one of the filter circuits of FIGS. 3A and 3B, referenced for convenience as filter circuit 70A. As shown in FIG. 4, the filter circuit 70A includes three stages: a low pass pre-filter stage 120; a programmable fine tuning stage 122; and, a post-filter low pass stage 124. The low pass pre-filter stage 120 receives the analog signal from the sensor 30 on line 51 and removes signals that are higher than the acceptable cutoff frequency for the programmable fine tuning stage 122. The programmable fine tuning stage 122 includes a programmable switched capacitor device 126, such as a 6th order low pass Butterworth switched capacitor filter. The post-filter stage 124 is an R/C filter network which eliminates any clock noise that shows up in the output of the programmable switched capacitor filter 126. The filtered analog output from the filter circuit 70A is transmitted by line 128 to the ADC section 66. The filters included in the filter circuits 70 are anti-aliasing filters.

For the purpose of changing the cutoff frequency of the programmable switched capacitor filter 126, the CLKR pin 11 of the capacitor device 126 is connected by line 128 to an appropriate one of the lines in the FCLK bus 102. It will be recalled that each line in the FCLK bus 102 carries a square pulse wave generated by a generator included in the interval timer section 74. The frequency of the pulses on the line of the bus 102 applied to pin 11 of the switched capacitor device 126 determines the cutoff frequency of the switched capacitor device 126. In this respect, as mentioned before, the particular cutoff frequency for each switched capacitor device 126 is programmed in view of the particular type of sensor 30 which is feeding its analog signal to the filter circuit 70 in which the switched capacitor device 126 is included.

The ADC section 66 of each ASP 50 receives filtered analog signals from the four filter circuits 70. In the illustrated ASP 50A of FIGS. 3A and 3B, the ADC section 66 of ASP 50 receives filtered analog signals on lines 128A, 128B, 128C, and 128D from the filter circuits 70A, 70B, 70C, and 70D, respectively. As shown in FIGS. 3A and 3B, the four filtered analog signals on lines 128A–128D are applied to input pins of an ADC multiplexer (MUX) 140. An output pin of the ADC MUX 140 is connected to a sampling input pin of an analog-to-digital converter chip 142. Input select pins on the ADC MUX 140 are connected by a three bit select bus 144 to the CPU 80 via the peripheral parallel interface section 68 in the manner hereinafter described. At any given moment of time the particular signal on the select bus 144 determines which of the filtered analog sensor signals is to be applied to the ADC chip 142. In the illustrated embodiment, the ADC MUX 140 is an analog multiplexer having part number CO4051BC.

The ADC chip 142 is the heart of the ADC section 66. In addition to having its sampling input pin connected to the output pin of the ADC MUX 140, the ADC chip 142 has its voltage reference pin connected to a voltage reference source. The eight data pins of the ADC chip 142 are connected to data bus 98. The ADC chip 142 has its chip select pin, its read enable pin, and its write enable pin connected to the chip select and control bus 93. A conversion is performed for the signal multiplexed to the ADC chip 142 when the chip select pin and the write select pin are enabled by the CPU 80. A BYTE SELECT pin of the ADC chip 142 is connected to a bit (LA1) of the address bus 96. While the ADC chip 142 is performing a conversion, the inverted BUSY pin is low. When a conversion is completed, the inverted BUSY pin goes high, causing the application of an interrupt to pin 42 of the CPU 80 via the interrupt bus 95. In the illustrated embodiment, the ADC chip 142 bears part number AD7578BD.

Figure 7A:
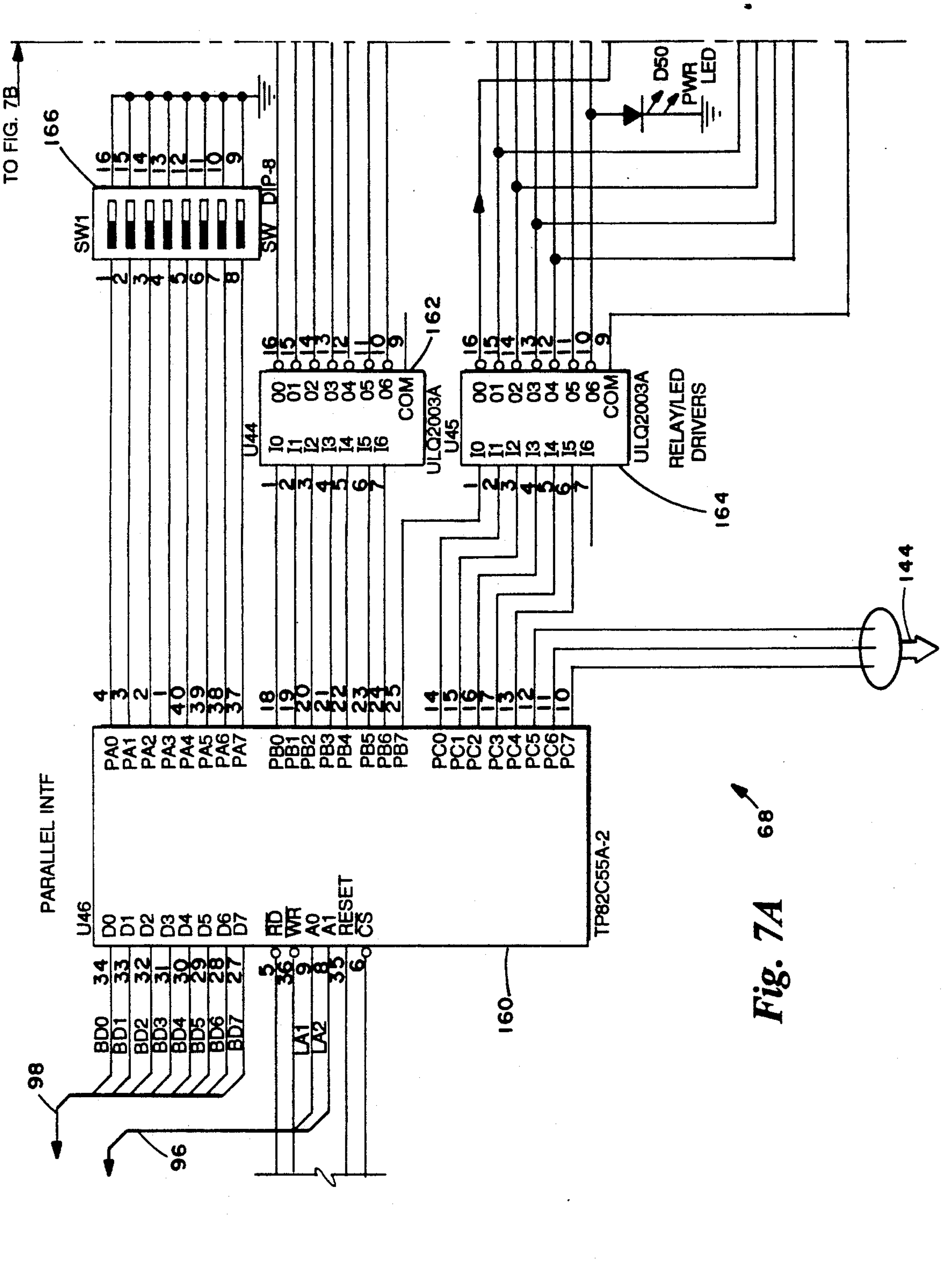
FIGS. 7A and 7B are detailed schematic views of a parallel communications section of the enhancement processor unit of the embodiment of FIG. 3.
Figure 7B:
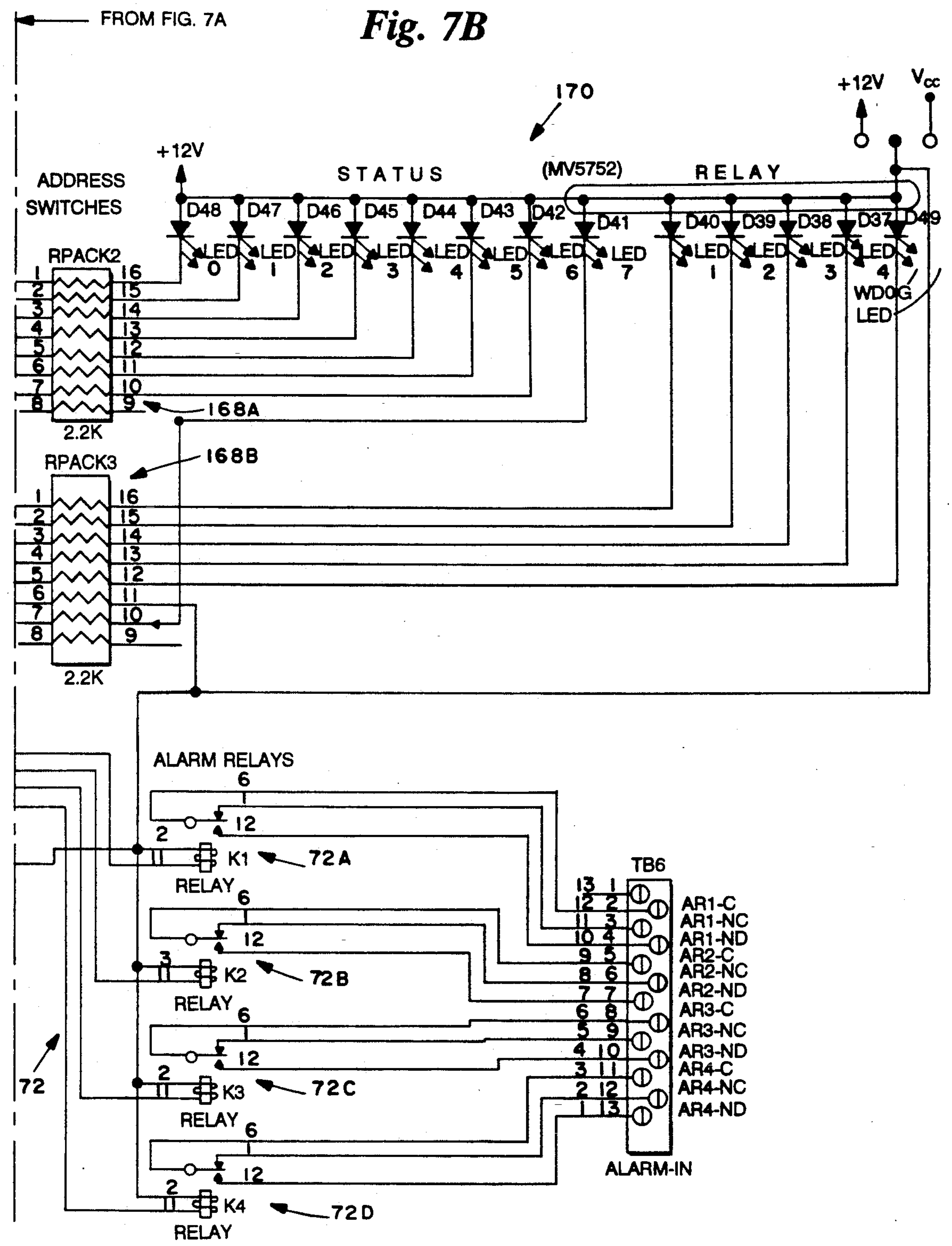

FIGS. 7A and 7B show the peripheral parallel interface section 68 and the bank 72 of relay switches included in the ASP 50. As shown in FIGS. 7A and 7B, the peripheral parallel interface section 68 includes a parallel interface chip 160; a pair of drivers 162 and 164; and, ASP unit address switches 166. In the illustrated embodiment, the parallel interface chip 160 bears part number TP82C55A. Data pins of the interface chip 160 are connected to the data bus 98; address pins of the interface chip 160 are connected to leads LA1 and LA2 of the address bus 96. Read enable, write enable, reset, and chip select pins of the interface chip 160 are connected to the chip select and control bus 93.

Parallel data pins PA0–PA7 of the interface chip 160 are connected to the ASP unit address switch 166 so that an identification number of the particular ASP 50 can be used to identify each ASP unit 50. Parallel data pins PB0–PB7 and PC0 and PC7 of the interface chip 160 are connected to through driver 160 and resistor packs 168A and 168B to a bank of status indicators, such as LEDs. Parallel data pins PC0–PC3 of the interface chip 160 are connected via the driver 164 to relays 72A, 72B, 72C, and 72D, respectively included in the relay bank 72. PC4 of the interface chip 160 is connected to a status LED and watchdog timer input. Parallel data pins PC5–PC7 of the interface chip 160 are connected to the bus 144 for the ADC multiplexer 140 select. In the illustrated embodiment, the relays 72A–72D are form 1C relays, bearing part number A25-SDSE.

Figure 8:
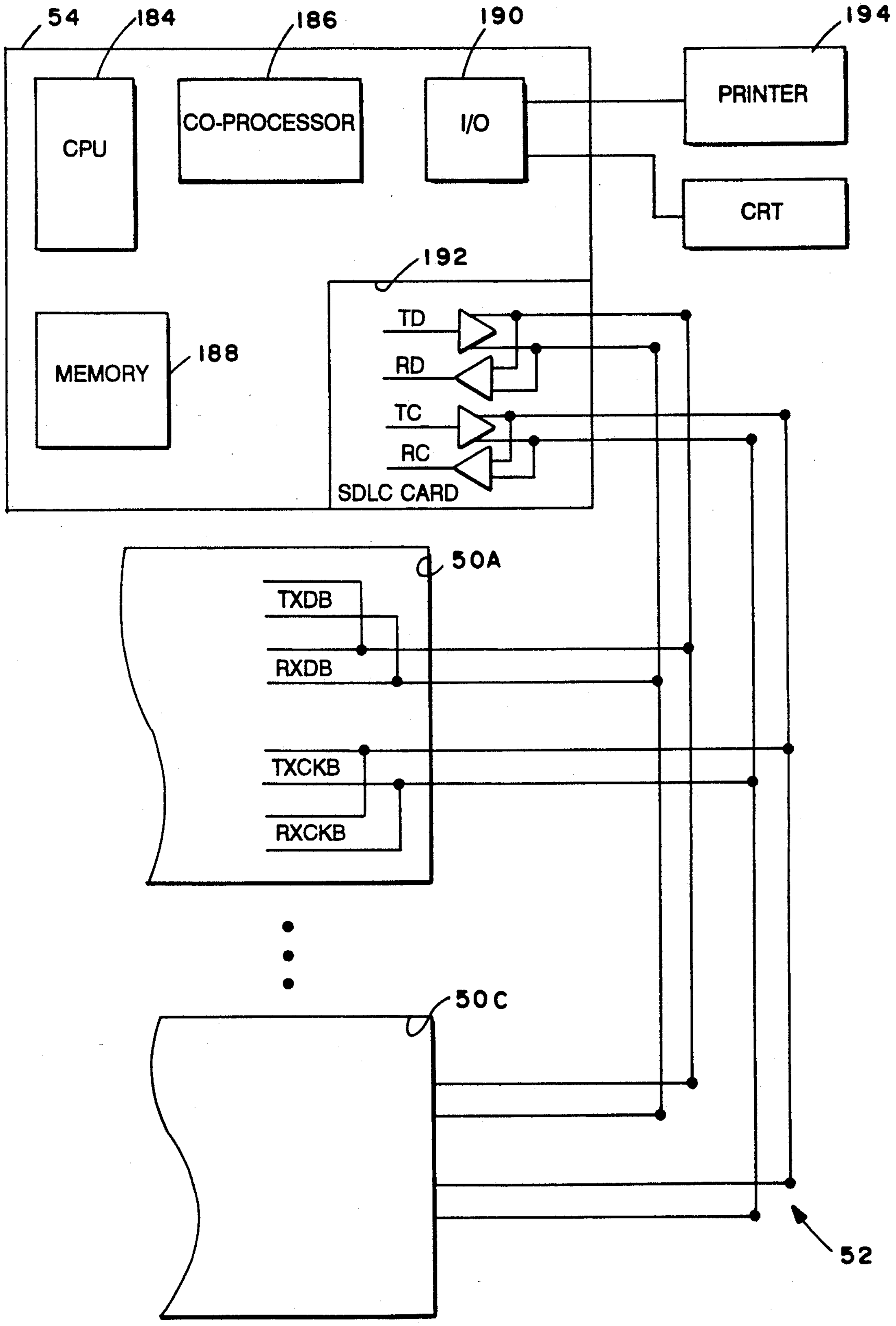
FIG. 8 is a schematic view showing the connection of portions of a plurality of enhancement processor units of the embodiment of FIG. 2 to a retraining workstation via a communications network.

The retraining workstation 52 is schematically shown in FIG. 8. The retraining workstation 52 is, in the preferred embodiment, an IBM-compatible personal computer of at least the 286 class. As such, the retraining workstation includes a CPU 184; a co-processor 186; memory 188 (including a hard disk drive); input/output (I/O) 190; and, a card slot for accommodating an SDLC communications card 192. As shown in FIG. 8, the retraining workstation 54 has a printer 194 and a CRT display 196 connected thereto.

FIG. 8 also shows how a plurality of ASPs 50 are connected to the ASP communications network 52. The network 52 is a bus structure. FIG. 8 in particular shows how one of the SDLC channels 106 of the serial communications section 62 of ASP 50A is connected to the communications network 52. Other ASP units, such as ASP 50B and ASP 50C of FIG. 2, are connected to the network 52 in like manner as ASP unit 50A.

As will become apparent in the ensuing discussion of the operation of an ASP 50, the CPU 80 of each ASP 50 executes a set of instructions included in a program ASPROM which resides in the EPROM bank 92. Included in the program ASPROM is a system 200 of classifier networks which are likely unique for each ASP 50. The classifier networks are known as adaptive learning networks ("ALNs"). Examples of adaptive learning networks are provided in U.S. Pat. No. 4,213,183 to Barron et al., which is incorporated herein by reference. Since each ASP 50 monitors two zones in the current embodiment, the program ASPROM stored at each ASP 50 has two classifier network systems 200 with a first of the classifier network systems pertaining to a first zone and a second of the classifier network systems pertaining to a second zone.

Figure 10:
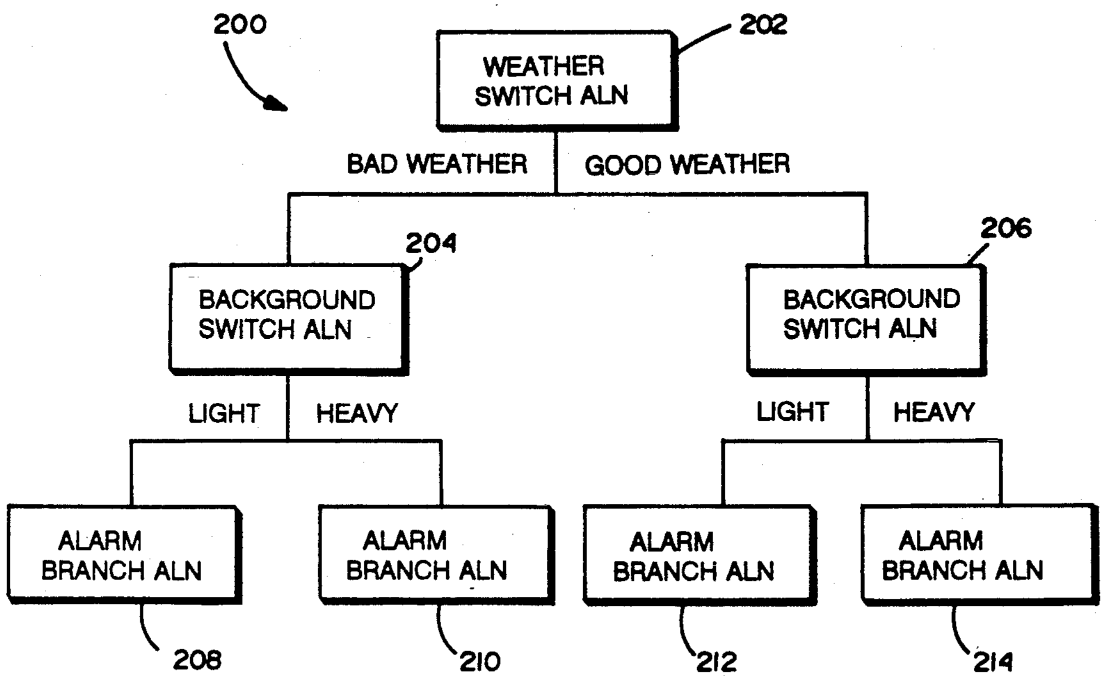
FIG. 10 is a schematic view of a system of classifier networks for an enhancement processor unit of the embodiment of FIG. 2.

As shown in FIG. 10, the program ASPROM includes two types of ALN classifiers for each classifier network system 200—switch classifiers and branch classifiers. In particular, for the particular embodiment being described FIG. 10 shows a tree structure for a classifier network system 200 including a "weather" switch ALN 202; a "bad weather background" switch ALN 204; a "good weather background" switch ALN 206; a "bad weather/light background alarm" branch ALN 208; a "bad weather/heavy background alarm" branch ALN 210; a "good weather/light background alarm" branch ALN 212; and, a "good weather/heavy background alarm" branch ALN 214.

In other embodiments, the types of switch ALNs are not limited to weather and background. That is, other types of switch ALNs may be provided for any occurrance of the environment or site which would cause the sensors to respond in an unusual or non-ordinary manner.

Figure 11:
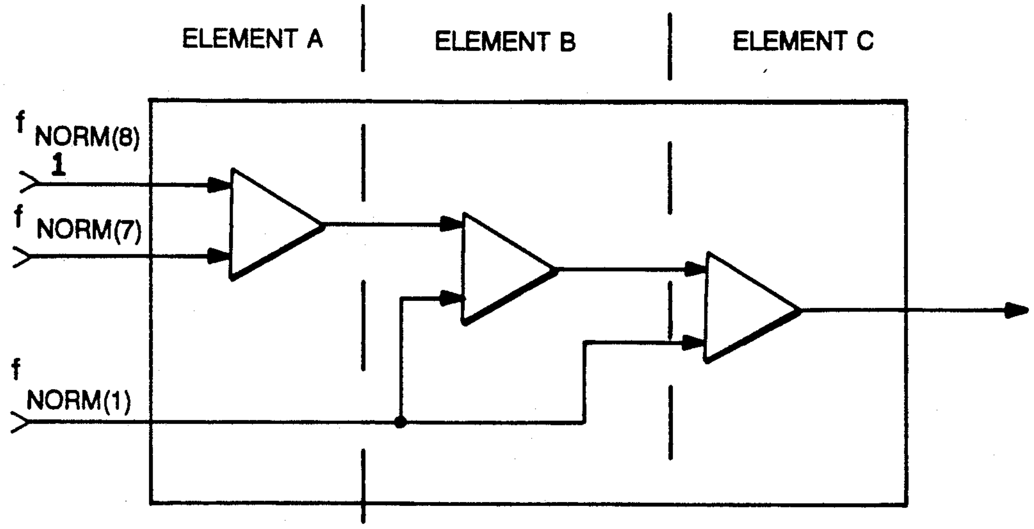
FIG. 11 is a schematic view of a configuration of a classifier network for an enhancement processor unit of the embodiment of FIG. 2.

As will also become more apparent in the ensuing discussion, each ALN classifier comprises one or more "elements" or stages of polynomials which are evaluated upon execution of the ALN. FIG. 11 illustrates the configuration of an ALN classifier having three elements (elements A, B, and C). Each element is a polynomial having terms which are either a coefficient or a product of a coefficient and one or more "features". The coefficients ($C_0$, $C_1$, . . . $C_7$) for each ALN classifer are either pre-programmed into the ASPROM program or are downloaded thereto from the retraining workstation 54. The features are calculated by the CPU 80 on the basis of input from the sensors connected to the ASP 50, as will be understood in connection with the description of the operation of as ASP 50 as described below.

Upon execution of all the stages or elements of an ALN classifier, a real number is obtained as an ultimate evaluation result. The evaluation result of an ALN is then compared with the ALN ALARM THRESHOLD value previously downloaded for the ALN. Any evaluation result greater than the ALN ALARM THRESHOLD is considered a positive result; any evaluation result less than the ALN ALARM THRESHOLD is considered a negative result. For example, if the ultimate evaluation result of the weather switch ALN 202 is greater than the ALN THRESHOLD VALUE for switch ALN 202, bad weather is occurring in the zones monitored by the ASP 50. Likewise, if the ultimate evaluation result of one of the branch ALNs 208 through 214 exceeds the ALN ALARM THRESHOLD for the branch ALN, an intrusion is suspected to have occurred in the zones monitored by the ASP 50.

INSTALLATION

An ASP 50 is installed in an existing physical security system by conducting the following generalized steps: (1) connecting an ASP unit 50 intermediate each transponder 28 and the sensors 30 associated with the transponder; (2) establishing an address for each ASP 50; (3) connecting each ASP unit 50 to the retraining workstation 54 via the ASP communications network 52; (4) downloading programmed instructions to each ASP unit 50; (5) downloading parameters to each ASP 50 in accordance with the particular type of sensors associated with an ASP 50; and, (6) downloading ALN-related parameters such as the ALN ALARM THRESHOLD and ALN coefficients ($C_0$, $C_1$, . . . $C_7$ for each stage in the ALN) for each ALN classifier included in the classification network system for the ASP 50.

The ensuing discussion is an elaboration of the foregoing summarized steps in the context of installing ASPs at the conventional physical security system 20 of FIG. 1 in order to transform system 20 into the enhanced physical security system 20' of FIG. 2. For the purpose of this discussion, it is assumed that each transponder 28 serves two zones (such as transponder 28A serving Zone 1 and Zone 2, for example), and that two sensors are located within each Zone. Furthermore, it is assumed that one of the sensors in each Zone is a microwave type sensor (microwave) and the other is a ported coax type sensor.

To connect an ASP unit 50 between a transponder 28 and a sensor 30, the line 51 is connected from the analog output of the sensor element 31 to the ASP 50. In particular, as shown in FIG. 2A, the line 51 connects the analog output of the sensor element 31 to the particular ASP filter 70 associated with the sensor. For example, the analog output of sensor element 31 is connected by line 51A to the filter 70A1 (see FIGS. 3A and 3B) included in the ASP 50A of FIG. 2. As also shown in FIG. 2A, the looped line 38 is modified by taking the sensor alarm closure relay 34 out of the line 38 and connecting an ASP closure relay 72 in series with the transponder 28 and the tamper closure relay 35. For example, for sensor 30A1 the looped line 38A1 has relay closure 72A1 of the ASP 50A connected in series therewith (in the manner understood from the connection of relay closure 72A of FIGS. 7A and 7B). Thus, the ASP closure relay 72 serves as output state simulation means for simulating the sensor alarm relay closure 34 from which the transponder 28 expects to receive a signal indicative of the output state of sensor 30. However, the ASP closure relay 72 is instead responsive to results of ALN classifiers included in a program ASPROM and fools the transponder 28 into thinking that the ASP closure relay 72 is the sensor alarm relay.

Since, in the current illustration, an ASP 50 serves four sensors, the bank of filters 70 of an ASP 50 has four lines 51 connecting the ASP 50 to four respective sensors 30 and four alarm closure relays 72. Thus, although not necessarily shown as such in FIG. 2A, it is necessary to connect the bank of filters 70 to the four lines 51 and to include four alarm closure relays 72, one for each sensor.

An address is established by an ASP 50 by manually setting the address switch 166 (see FIGS. 7A and 7B) to an appropriate value. Each ASP 50 is set to have a unique identifying address for purposes of the protocol of the ASP communications network 52.

FIGS. 6A, 6B and 8 show how an ASP 50 is connected to the ASP communications network 52. In particular, the FIGS. 6 and 8 show how the TXDB, RXDB, TXCKB, and RXCKB lines of one of the channels (channel 106B) of the SDLC channel 106 included in the ASP 50 are connected to corresponding lines in the ASP communications network 52, and how the lines in the ASP communications network 52 are connected to the SDLC card 192 in the retraining workstation 54. In embodiments wherein a second channel (such as channel 106A) of each ASP 50 is utilized in a bidirectional ASP communications network, it is understood that the network 52 includes a second set of corresponding lines and that the SDLC lines of the other channel are connected to such second bus in like manner as shown in FIG. 8 with respect to a first channel.

A software program known as ASPROM resides in the EPROM 92. In one mode of the invention, the program ASPROM is pre-programmed into the EPROM 92. In another mode, the program ASPROM is downloaded into memory of the ASP 50 from the retraining workstation 54 via the ASP communications network 52. As explained hereinafter, each ASP 50 has a customized version of the program ASPROM specially tailored to take into consideration characteristics of the zones monitored by the ASP 50 and the types of sensors 30 in connection with which the ASP 50 operates. The steps performed by an ASP 50 in conjunction with the execution of a typical program ASPROM are described below in connection with FIG. 9.

With the program ASPROM downloaded from the retraining workstation 54 to each ASP 50, an operator at the workstation 54 can download certain sensor-related configuration parameters for each ASP 50 using the program ASPROM. Two types of such operating parameters are downloaded in the embodiment under discussion: the cutoff frequency for each switched capacitor filter 126 included in the ASP filters 70; and, the analog-to-digital sampling rate associated with each sensor 30 connected to the ASP 50.

In the above regard, for each of the four switched capacitor filters 126 included in the filter bank 70 of an ASP 50, a value indicative of a cutoff frequency is downloaded to a suitable location in memory section 64. The processing section 60 then uses the four respective values to program the two interval timers 100 and 101. The programming of the timer 100 and 101 causes the three square wave generators of timer 100 and the square wave generator of timer 101 to produce square wave pulses at frequencies corresponding to 100 times (100×) the cutoff frequencies for the sensors 30 with which each generator is paired. The manner of programming the interval timers 100 and 101 is understood from the preceding discussion of the pin connections of the timers 100 and 101.

As an example of the foregoing, if ASP 50A is connected in Zone 1 to ported coax sensor 30A1 and microwave sensor 30A2, and in Zone 2 to ported coax sensor 30A3 and microwave sensor 30A4, then values indicative of the proper cutoff frequencies for these sensors are stored in the timers 100 and 101. As it turns out, in the illustrated embodiment the cutoff frequencies for both a ported coax-type sensor and a microwave sensor is 10 Hz. Accordingly, values indicative of 10 Hz are programmed into the timers 100 and 101 so that square wave pulses of these frequencies are output on bus 102 to each of the switched capacitor filters 126 in filter bank 70. Although the sensor types of the illustrated embodiment have the same filtering cutoff frequency, it should be understood that the invention allows for the programming of timers for sensors requiring other cutoff frequencies.

The second type of sensor-related downloaded operating parameters is the analog-to-digital conversion sampling frequency. Each of the sensors 30 connected to the ASP 50 could require differing sampling rates. As in the case of the cutoff frequencies, for each sensor connected to the ASP 50 an operator at the retraining workstation 54 downloads a value indicative of the conversion frequency to the ASP 50. Thus, four values corresponding to the conversion sampling frequency for four sensors 30 are downloaded. The sampling frequency for each sensor channel is stored in a suitable location in the memory section 64. The processing section 60 then controls the rate of sampling of each converted sensor signal in the manner described hereinafter with reference to FIG. 9.

Figure 12:
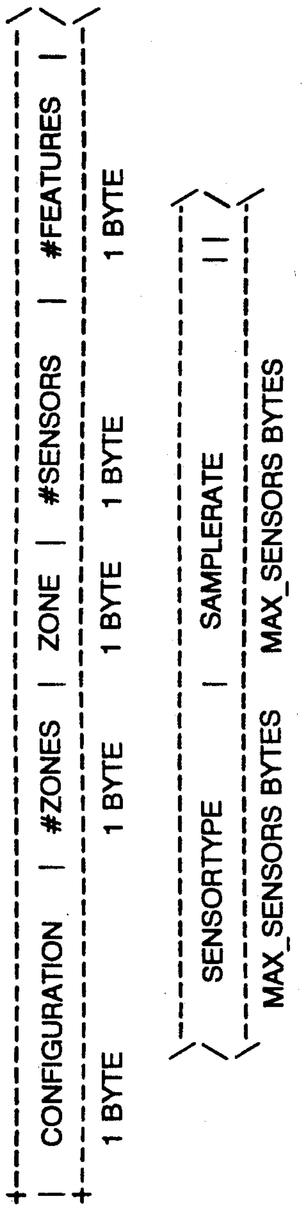
FIG. 12 is a schematic view of the format of a "configuration" message.

FIG. 12 schematically shows a "configuration" message utlized to inform a specified ASP 50 about its particular connectivity and its respective parameters. The "# zones field" specifies the number of zones that this ASP 50 is processing. The "zone field" specifies which zone is to be configured via the contents of this particular configuration message. The "# features" field specifies the number of features that are to be generated for this zone. The "# sensors" field indicates the current number of sensors (irrespective of type) that are connected to the specified ASP 50. The "sensortype field" is used to indicate the particular type of each of the attached sensors. The "samplerate" field indicates the rate at which the signals will be sampled.

A third type of sensor-related configuration parameter is a noise characteristic constant (NOISE) for each type of sensor 30 connected to the ASP unit 50. The noise characteristic constant for each sensor 30 is empirically determined. Thus, values corresponding to the noise characteristic constants for all sensor types connected to an ASP unit 50 are stored in the EPROM 92.

In addition to the sensor-dependent operating parameter, ALN classifier-related parameters are also downloaded to the ASP unit 50 via the ASPROM program, including the ALN ALARM THRESHOLD and ALN coefficient values ($C_0$, $C_1$, . . . $C_7$) mentioned previously. For the current discussion, the downloaded value for ALN ALARM THRESHOLD for each ALN corresponds to "0". The significance of the ALN ALARM THRESHOLD value and the ALN coefficients ($C_0$, $C_1$, . . . $C_7$) will be better understood from the ensuing discussion.

Figure 13:
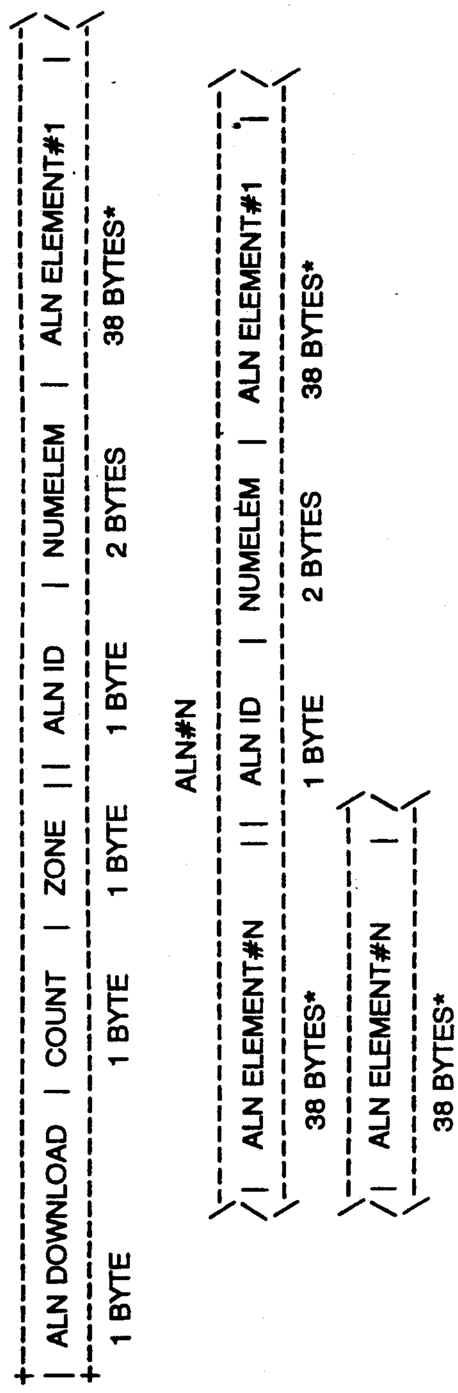
FIG. 13 is a schematic view of the format of an "ALNdownload" message.

FIG. 13 schematically depicts an "ALNdownload" message by which the retraining workstation 54 sends new or an additional ALNs to a specified ASP 50. The "count" field represents the number of ALNs that are contained in the message. The "zone" field represents the destination zone at the receiving ASP 50. The "ALNid" filed is a unique number (within that particular ASP 50) that identifies a specific ALN. The "numelem" field specifies the number of elements wihtin that particular ALN. The actual format of each of the ALN elements is three two-byte integers and eight four-byte floating-point values.

It should be understood that a plurality of ASP units 50 can be installed in a conventional physical security system without connecting the ASP units 50 to a retraining workstation 54. In such a case, steps (3) through (5) are replaced by storing the program ASPROM (and the operating parameters that would otherwise be downloaded through the program ASPROM) in the EPROM 92.

OPERATION

After the ASP 50 is installed in the manner described above, the program ASPROM stored in the SRAM 90 is executed by the processing section. Upon start up of an ASP unit 50, the execution of program ASPROM conducts several initialization and calibration operations. Included among these operations is the determination of a signal variance at set up ($VAR_{set-up}$(N)) for each sensor 30N connected to an ASP 50. The value for $VAR_{set-up}$(N) is determined during the first second of set up under the assumption that no intrusions occur during set up. The value of $VAR_{set-up}$(N) is determined by extracting features from the associated sensor's digitally converted signal during set up, and setting a threshold value significantly above such variance to remove base line noise and the like.

Figure 9A:
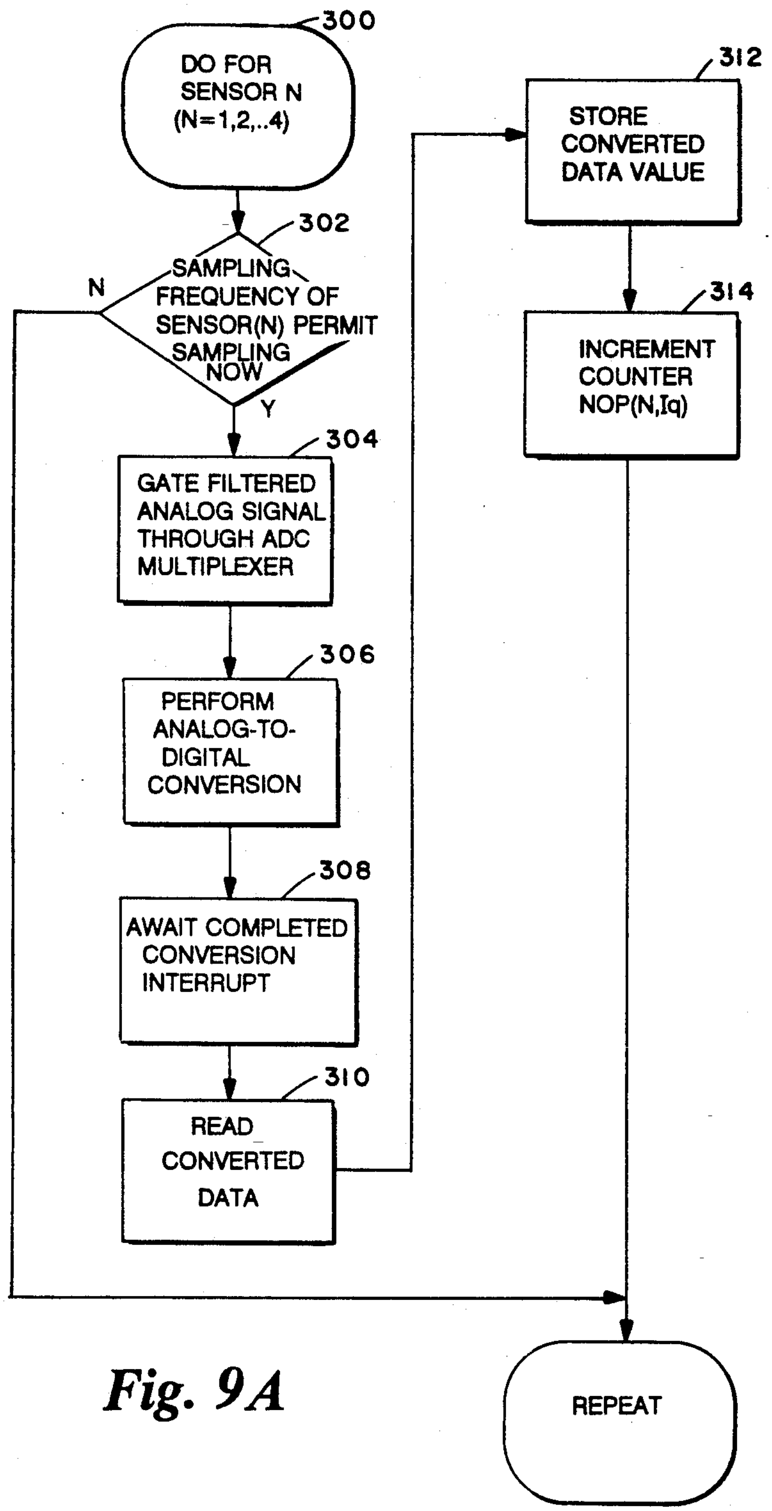
FIGS. 9A, 9B, and 9C are schematic views showing steps performed by an enhancement processor unit of the embodiment of FIG. 2 in conjunction with the execution of a program ASPROM.
Figure 9C:
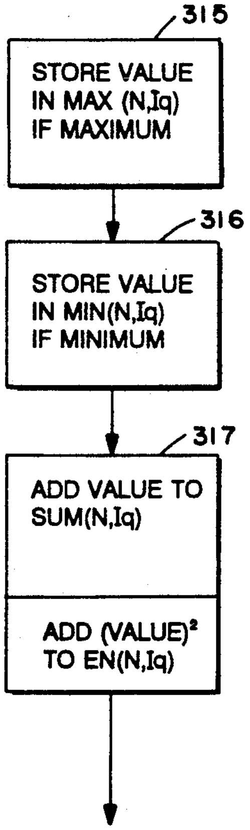
Figure 9B:
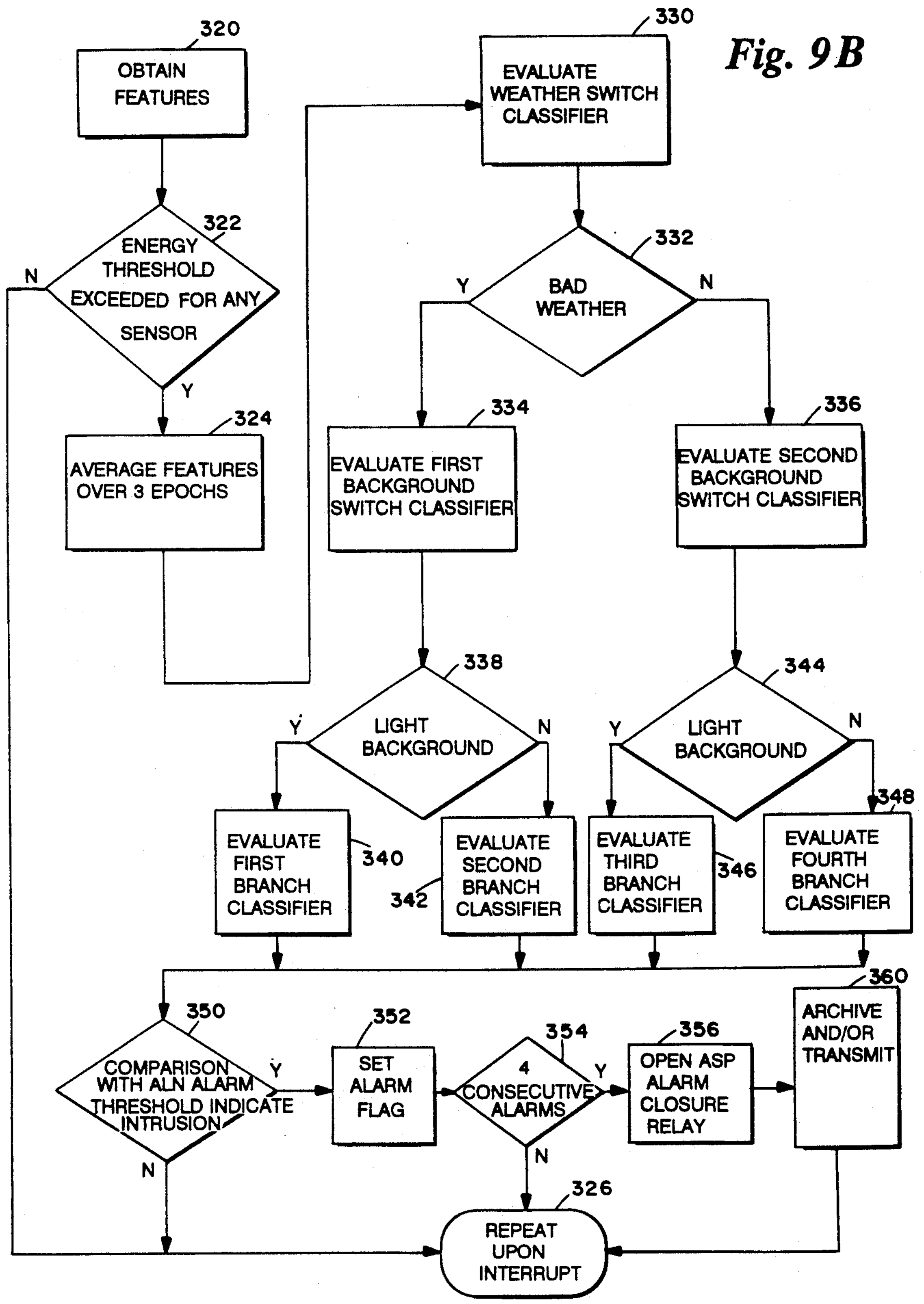

FIG. 9 shows steps performed by an ASP 50 of the embodiment of FIG. 2 in conjunction with the execution of the program ASPROM after the initialization and calibration procedures of start up. The processing section 60 of the ASP 50, and in particular the CPU 80, is programmed to provide prompts to itself at a master sample rate and every 0.25 second of time. The master sample rate (on the order of about once every 1.8 milliseconds) is preprogrammed in EPROM 92, and the sensor sample rates are divisions of that value. FIG. 9A shows steps that are conducted at the master sample rate; FIG. 9B shows steps that are conducted every 0.25 second.

As used herein, a 0.25 second time period is referred to as an "Interval". The notation $I_q$ refers to a current interval, while the notation $I_{q-1}$, $I_{q-2}$, and $I_{q-3}$ refers to the three intervals of time next preceding the current intervals. Four consecutive intervals (i.e., one second) constitute an "epoch".

With the ASP 50 up and running, each of the four sensors 30 supply analog signals from their sensor elements 31 on the line 51 to the respective ASP filter circuits 70 (see FIG. 4). The filtered analog sensor signals from each of the four sensors are applied on lines 128 to the ADC multiplexer 140 (see FIGS. 3A and 3B).

As mentioned above, at the master sample rate the CPU 80 prompts itself to execute the steps depicted in FIG. 9A. As shown by symbol 300, the steps of FIG. 9A can be conducted after every master sampling prompt for each of the four sensors 30 connected to the ASP 50. In this respect, the CPU 80 expects to execute the steps of FIG. 9A for each of the four sensors in serial fashion. That is, with reference to the embodiment of FIG. 2 and ASP 50A as an example, the steps of FIG. 9A are executed first for sensor 30A1, then for sensor 30A2, then for sensor 30A3, and lastly for sensor 30A4. Following that, the steps of FIG. 9C are executed serially for the four sensors 30. In the discussion that follows, the execution of the steps of FIG. 9A are discussed with respect to sensor 30N (it being understood that sensor 30N can be any one of the four sensors 30 connected to the ASP 50).

At step 302, the CPU 80 determines whether it is timely to sample the filtered analog output signal of sensor 30N. In this respect, the CPU 80 checks the previously downloaded and now stored value of the ADC sampling frequency for sensor 30N to determine whether sufficient time has elapsed since the last sampling of sensor 30N. If insufficient time has elapsed, sensor 30N is skipped for this 1.8 millisecond interrupt, and the execution of the steps of FIG. 9A continue for sensor 30(N+1). Otherwise, execution continues with step 304.

At step 304 the CPU 80 causes the filtered analog signal from sensor 30N to be gated through the ADC multiplexer 140 to the ADC chip 142. The gating is accomplished by directing the parallel interface chip 160 (see FIGS. 7A and 7B) to apply a signal corresponding to the value of "N" for sensor 30N on the bus 144 to the select pins of the ADC multiplexer 140.

At step 306 the CPU 80 enables the ADC chip 142 to perform the analog-to-digital conversion for the filtered analog signal from sensor 30N. As explained above, the conversion enablement occurs when the CPU 80 enables the chip select pin and the write select pin of the ADC chip 142. Upon enablement, the ADC chip 142 sets its BUSY pin low, indicating that a conversion is in progress.

While the ADC chip 142 is performing its conversion, the CPU 80 does other processing while expecting (at step 308) an interrupt indicating that the conversion is finished. The interrupt occurs when the BUSY pin of the ADC chip 142 again goes high and is applied to CPU 80 at pin 42 thereof.

Having received the conversion finished interrupt from the ADC chip 142, at step 310 the CPU 80 reads the converted digital data for sensor 30N. In this respect, the CPU activates the chip enable and read enable pins of the ADC chip 142 so that the converted digital output data is applied on the data bus 98 to the memory section 64 where the data is stored (step 312).

Thus, in the manner described above with reference to FIG. 9A, digital data is stored in the memory section 64 of the ASP 50 for each of the four sensors connected thereto. The stored data is utilized in the manner understood from the following discussion of the steps of FIG. 9B.

At step 314 the CPU 80 increments a counter NOP(N,$I_q$) ("number of points") to reflect the number of sampling points thus far obtained for sensor 30N during a 0.25 second interval.

As mentioned above, after the steps of FIG. 9A are executed for each of the sensors 30A1, 30A2, 30A3, and 30A4, the steps of FIG. 9C are executed serially for those four sensors. At step 315 of FIG. 9C, the CPU 80 determines whether the value of the digital data just converted exceeds any previous values obtained in the current 0.25 second interval for the sensor 30N and, if so, stores the most recent data value in a memory location MAX(N,$I_q$). Likewise, at step 316 the CPU 80 determines whether the value of the digital data just converted is smaller than any previous values obtained in the current 0.25 second interval and, if so, stores the most recent data value in a memory location MIN(N,$I_q$).

At step 317 the CPU 80 adds the value of the digital data just converted for sensor 30N to a memory location SUM(N,$I_q$), and the square of the value to a memory location EN(N,$I_q$), for tabulating running respective summations of the values and their squares for sensor 30N during this 0.25 second interval.

As mentioned above, every 0.25 seconds (i.e. at the end of each interval) the CPU 80 prompts itself to execute the steps of FIG. 9B. It should be understood that the steps of FIG. 9B are executed for each zone monitored by the ASP 50. Referring again to the previously employed example, the steps of FIG. 9B would first be executed by the CPU 80 in the ASP 50A for zone 1 and then would be executed for zone 2.

At step 320 of FIG. 9B, the CPU 80 analyzes the digital data obtained (from the sensors 30 and stored in the memory section 64) during the last 1.0 second epoch for computing a number of "features". In the illustrated embodiment, using the digital data values stored in the memory section 64 for the 1.0 second epoch, the following "features" are computed over the 1.0 second epoch with respect to each of the sensors in the zone: minimum value; maximum value; mean value; and variance.

With respect to the features extracted for an interval $I_q$, the minimum and maximum values are the lowest digital value and the highest digital value, respectively, obtained for a sensor during the 0.25 second interval. As will be recalled, these values are stored in the locations MIN(N,$I_q$) and MAX(N,$I_q$), respectively. The mean feature is calculated in the following manner:

$$\text{mean}(N) = \frac{SUM(N,I_q) + SUM(N,I_{q-1}) + SUM(N,I_{q-2}) + SUM(N,I_{q-3})}{NOP(N,I_q) + NOP(N,I_{q-1}) + NOP(N,I_{q-2}) + NOP(N,I_{q-2})}$$

The variance for sensor 30N during the 1.0 second epoch is the square of the standard deviation for the values obtained during the 1.0 second epoch.

It should be understood that, in other embodiments other types of classification features can be utilized.

Thus, considering the example of ASP 50 having sensors 30A1 and 30A2 connected thereto for monitoring Zone 1, and based on the data stored in a 0.25 second interval $I_q$, the following eight features are determined at step 320:

feature "$f_1$"—the minimum for sensor 30A1
feature "$f_2$"—the maximum for sensor 30A1
feature "$f_3$"—the mean for sensor 30A1
feature "$f_4$"—the variance for sensor 30A1
feature "$f_5$"—the minimum for sensor 30A2
feature "$f_6$"—the maximum for sensor 30A2
feature "$f_7$"—the mean for sensor 30A2
feature "$f_8$"—the variance for sensor 30A2

The features $f_1$-$f_8$ determined for the 1.0 second epoch are stored in the memory section 64.

At step 322 the CPU 80 of an ASP 50 determines if, for any of the two sensors connected to the ASP 50, the energy threshold was exceeded during the 1.0 second epoch. The determination is made by comparing the current cumulative energy of the sensor 30N (i.e., EN(N,$I_k$)) to the energy threshold of the sensor [i.e., the product of NOISE(N) * $VAR_{set-up}$(N)]. If the energy threshold is exceeded for any one of the sensors 30N, execution continues at step 324. Otherwise, execution jumps to the location represented by symbol 326.

At step 324 the CPU 80 averages, over the last three epochs, the values obtained for each feature.

Steps 330-362 of FIG. 9B reflect operation of a system 200 of classifier networks of FIG. 10. As mentioned above, each ALN classifier comprises one or more "elements" or stages of polynomials which are evaluated upon execution of the ALN. Upon execution of all the stages or elements in the appropriate branch of an ALN classifier, a real number is obtained as an ultimate evaluation result. The evaluation result of an ALN is then compared with the ALN ALARM THRESHOLD value previously downloaded for the ALN. The comparison indicates whether the measured data indicates the occurrence of a certain event.

As shown in FIG. 10, each ALN classifier network system 200 includes two types of ALN classifiers—switch classifiers and branch classifiers. In particular, FIG. 10 shows in a tree structure a "weather" switch ALN 202; a "bad weather background" switch ALN 204; a "good weather back-ground" switch ALN 206; a "bad weather/light background alarm" branch ALN 208; a "bad weather/heavy background alarm" branch ALN 210; a "good weather/light background alarm" branch ALN 212; and, a "good weather/heavy background alarm" branch ALN 214. Upon execution of all the stages or elements of an ALN classifier, a real number is obtained as an ultimate evaluation result. The evaluation result of an ALN is then compared with the ALN ALARM THRESHOLD value previously downloaded for the ALN. The comparison indicates whether the measured data is believed to indicate the occurrence of a certain event. The ultimate evaluation result of the weather switch ALN 202, for example, indicates whether it is believed that bad weather is occurring in the zones monitored by the ASP 50. The ultimate evaluation result of one of the branch ALNs 208 through 214 indicates whether an intrusion is thought to have occurred in the zones monitored by the ASP 50.

The evaluation of the weather switch ALN classifier 202 occurs at step 330. (The evaluation of an ALN classifier will be discussed subsequently with reference to a branch ALN classifier, the evaluation procedure for the illustrated embodiment being similar for all ALN classifiers.) If, at step 332, the CPU 80 determines that evaluation of the weather switch ALN classifier 202 indicates the presence of bad weather, processing jumps to step 334. At step 334 the bad weather/background switch ALN 204 is evaluated. Alternatively, if at step 332 the CPU 80 determines that evaluation of the weather switch ALN classifier 202 indicates good weather, processing jumps to step 336.

At step 334 the bad weather/background switch ALN classifier 204 is evaluated. If, at step 338, the CPU 80 determines that evaluation of the switch ALN classifier 204 indicates the presence of light background noise, processing jumps to step 340 where the bad weather/light background branch ALN 208 is evaluated. If heavy background noise is found, processing jumps to step 342 where the bad weather/heavy background branch ALN 210 is evaluated.

If processing were to jump to step 336 under the circumstances of good weather, at step 336 the good weather/background switch ALN classifier 206 is evaluated. If, at step 344, the CPU 80 determines that evaluation of the switch ALN classifier 206 indicates the presence of light background noise, processing jumps to step 346 where the good weather/light background branch ALN 212 is evaluated. If heavy background noise is found, processing jumps to step 348 where the good weather/heavy background branch ALN 214 is evaluated.

Thus, in accordance with the foregoing, one of the alarm branch ALN classifiers 208, 210, 212, or 214 will be evaluated. At step 350 the ultimate evaluation result of the evaluated ALN classifier is compared to the ALN ALARM THRESHOLD value for the evaluated ALN classifier. That is, at step 350 the ultimate evaluation result is compared with the ALN ALARM THRESHOLD value for the particular one of the ALN branch classifiers actually evaluated (e.g., the first branch classifier, the second branch classifier, the third branch classifier, or the fourth branch classifier). If the comparison indicates that an intrusion occurred, a flag ALARM($I_q$) is set at step 352.

At step 354 the CPU 80 checks to determine if alarm flags have been set (with respect to the zone being processed) for four consecutive 1.0 second epochs. If so, at step 356 the CPU 80 of the ASP 50 sends a signal to the parallel interface chip 160 to open the alarm closure relays 72 for the zone being processed. For example, if the ASP 50A were to determine that alarm flags had been set for four consecutive 1.0 second epochs for Zone 1, alarm closure relays 72A1 and 72A2 would be opened.

The opening of the alarm closure relays 72 for Zone 1 is detected by monitoring device 39 included in transponder 28. The transponder 28 then sends an alarming signal on the communications network 26 for receipt by the central security computer 22. The central security computer 22 records or applies appropriate signals to the peripherals 40–48 connected to the computer 22.

At step 360 the CPU 80, executing the program ASPROM, causes certain information to be transmitted on the ASP communications network 52 to the retraining workstation 54. The transmitted information is useful to the retraining workstation 54 for developing refined ALN classifiers for the ASP 50 and for diagnostic purposes. The information transmitted at step 360 includes an identification of the zone in which the suspected intrusion occurred; the number of ALN classifiers utilized in determining the intrusion; the number of sensors active in the zone where the intrusion occurred; an indication of which sensors in the zone exceeded their energy threshold; the number of features actually utilized in the ALN classifiers; the actual values of the features; and, the energy threshold and DC offset values for each sensor in the zone. In the event that the ASP 50 is not able to transmit this retraining/diagnostic information via ASP communications network 52 to the retraining workstation 54, the ASP 50 archives the information in the SRAM 90.

The retraining workstation 54 can utilize the transmitted data to develop and download even more sophisticated classification networks for the ASP, thereby further enhancing the intelligence of the ASP unit. For example, upon receiving the retraining/diagnostic information from the ASP 50 together with operator-input indications of ground truth (e.g., whether the monitored event actually was an intrusion or a nuisance), the retraining workstation can develop new systems of classifier networks for the ASP 50. For example, the retraining workstation 54 might develop an entirely new polynomial requiring the selection of different features, together with new coefficient values. The newly produced system of classifer networks would thus be more intelligent, having "learned" from past experience, and be more capable of determining whether monitored events are intrusions or nuisances.

Discussion now turns to the evaluation of an ALN classifier. In the preceding discussion it was mentioned that a plurality of ALN classifiers are evaluated in connection with each classifier network system 200, in particular two switch ALN classifiers (a weather switch classifer [ALN 202] and one of two possible background switch classifiers [ALN 204 or ALN 206] and one of four possible branch ALNs (either ALN 208, ALN 210, ALN 212, or ALN 214). Although each ALN classifier has a unique set of coefficients ($C_0$, $C_1$, . . . $C_7$ for each ALN stage) and possibly a unique set of features, the ALNs are basically evaluated in the same manner.

CLASSIFIER EXAMPLE

What follows is an illustrative description of the evaluation of an ALN having the three stage configuration of FIG. 11. For the sake of this illustration, the ALN of FIG. 11 is assumed to be a branch or alarm ALN, such as either ALN 208, ALN 210, ALN 212, or ALN 214 of FIG. 10.

Each stage or element of the ALN of FIG. 11 is the following polynomial:

$$C_0+C_1X_1+C_2X_2+C_3X_1X_2+C_4X_1^2+C_5X_2^2+C_6X_1^3+C_7X_2^3$$

wherein the values $C_0$, $C_1$, . . . , $C_7$ are the coefficients for the ALN and wherein $X_1$ and $X_2$ are selected ones of the eight possible normalized features (assuming the ASP 50 monitors two zones and two sensors per zone) or are outputs of previous stages.

As indicated above, the ALN uses normalized features. Each ALN performs its own normalization, based upon training values for the ALN. The normalization is performed in accordance with the following relationship:

$$f_{norm(x)}=C_0+C_1f(x)$$

where $$C_0=-(MTV)/(SDTV)$$

$$C_1=1/(SDTV)$$

wherein MTV is the mean of the training values of the feature f(x) and SDTV is the standard deviation of the training values of the feature f(x).

For the first stage of the ALN of FIG. 11, the selected input features are assigned as follows:

$X_1 = f_{norm(8)}$ = normalized average variance for sensor 30A2 (a ported coax sensor)

$X_2 = f_{norm(7)}$ = normalized average mean for sensor 30A2 (a ported coax sensor).

For the second stage of the ALN of FIG. 11, the input features are as follows:

$X_1$ = output of the first stage *ALN* of FIG. 11

$X_2 = f_{norm(1)}$ = normalized average minimum for sensor 31A1 (a microwave sensor).

For the third stage of the ALN of FIG. 11, the input features are as follows:

$X_1$ = output of the second stage *ALN* of FIG. 11

$X_2 = f_{norm(1)}$ = normalized average minimum for sensor (a microwave sensor).

By way of illustration, the ALN classifier of FIG. 11 will now be numerically evaluated using example data. For the illustration, the ALN classifier of FIG. 11 has been assigned the following coefficient values:

| | stage 1 | stage 2 | stage 3 |
|---|---|---|---|
| $C_0$ = | −1.336E+00 | 2.844E−02 | 5.086E−02 |
| $C_1$ = | 9.863E−02 | 1.698E+02 | 1.614E+00 |
| $C_2$ = | 9.305E−01 | 2.923E−01 | 2.062E−01 |
| $C_3$ = | 0.000E+00 | −1.985E−01 | −1.428E−01 |
| $C_4$ = | 4.986E−02 | 0.000E+00 | 0.000E+00 |
| $C_5$ = | 1.275E+00 | 0.000E+00 | 0.000E+00 |
| $C_6$ = | 0.000E+00 | −6.099E−01 | −5.871E−01 |
| $C_7$ = | −5.266E−01 | 0.000E+00 | 0.000E+00 |

For the illustration, the following feature values were obtained during a 1.0 second epoch:

| | |
|---|---|
| $f_{avg(8)}$ = 1212.0 | $f_{norm(8)}$ = 2.344 |
| $f_{avg(7)}$ = 29.26 | $f_{norm(7)}$ = −0.630 |
| $f_{avg(1)}$ = −20.0 | $f_{norm(1)}$ = −0.574 |

Thus, for stage 1 of the ALN classifier of FIG. 11, when the values $$X_1 = f_{norm(8)} = 2.344$$

$$X_2 = f_{norm(7)} = -0.630$$

and above-assigned stage 1 coefficients are evaluated according the aforementioned polynomial, an output value of −0.779 results.

The output value of −0.779 from the resolution of the first stage ALN classifer of FIG. 11 becomes input $X_1$ for the second stage of the ALN classifier of FIG. 11. Thus, for stage 2 of the ALN classifier of FIG. 11, when the values $$X_1 = -0.779$$

$$X_2 = f_{norm(1)} = -0.574$$

and above-assigned stage 2 coefficients are evaluated according to the aforementioned polynomial, an output value of −1.263E+00 results.

The output value of −1.263E+00 from the resolution of the second stage ALN classifier of FIG. 11 becomes input $X_1$ for the third stage of the ALN classifier of FIG. 11. Thus, for stage 3 of the ALN classifier of FIG. 11, when the values $$X_1 = -1.263E+00$$

$$X_2 = f_{norm(1)} = -0.574$$

and above-assigned stage 2 coefficients are evaluated according to the aforementioned polynomial, an output value of −1.027E+00 results.

Since the ultimate resolution evaluation of the ALN classifier of FIG. 11 is less than the downloaded ALN ALARM THRESHOLD value of 0.000E+00, the event processed for interval $I_q$ is considered a nuisance rather than an intrusion.

While the invention has been particularly shown and described with reference to the preferred embodiments thereof, it will be understood by those skilled in the art that various alterations in form and detail may be made therein without departing from the spirit and scope of the invention.

The invention in which an exclusive property or privilege is sought is defined by the following claims:

1. A modular processor unit for intelligently enhancing a physical security system, said physical security system being of the type having a sensor and a central control station, and wherein a communications device transmits an alarm signal to the central control station in response to an output state of the sensor, said processor unit being connected intermediate the sensor and the communications device and comprising:

receiving means for receiving a signal from said sensor, said signal being reflective of a monitored event;

analyzing means for analyzing over a period of time a plurality of preselected features of said signal received from said sensor;

classifying means for using said plurality of preselected features to evaluate a polynomial and using the evaluation thereof to classify said event reflected by said signal as an intrusion or a nuisance; and, output state simulation means for simulating an element of said sensor from which said communications device expects to receive said sensor output state, said output simulation means being responsive to said classifying means for providing an output state in accordance with whether said event is classified by said classifying means as an intrusion or a nuisance.

2. The apparatus of claim 1, wherein said signal from said sensor is an analog signal, and wherein said processor unit further comprises analog to digital conversion means for converting said analog signal from said sensor to a digital signal, and wherein said digital signal is analyzed by said analyzing means.

3. The apparatus of claim 2, further comprising:

filter control means for establishing a frequency cutoff with respect to said analog signal from said sensor;

sampling frequency control means for establishing a sampling frequency at which said analog signal is sampled by said analog to digital conversion means;

communication means connecting said processor unit to a central downloading station; and, means for receiving downloaded parameters via said communication means and changing said frequency cutoff and said sampling frequency of said analog signal.

4. The apparatus of claim 1, wherein said element from which said communications device expects to receive said sensor output state is a closure relay, and wherein said output state simulation means is a closure relay repsonsive to said classifying means.

5. The apparatus of claim 1, wherein said communications device is a transponder.

6. The apparatus of claim 1, further comprising memory means and means for archiving data associated with said event, including said features, in said memory means.

7. The apparatus of claim 6, further comprising communication means for transmitting said archived data to a central data collection station.

8. The apparatus of claim 1, wherein said analyzing means analyzes features of said signal over a predetermined time base, and wherein said features include the minimum value of said signal over said time base, the maximum value of said signal over said time base, the mean of the values of said signal over said time base, and the square of the standard deviation of said signal over said time base.

9. The apparatus of claim 1, wherein said classifying means comprises:

a plurality of branch classifying means, each branch classifying means being preprogrammed to use preselected features in accordance with a particular different operating condition to classify said event reflected by said signal as an intrusion or a nuisance; and, switch classifying means which uses preselected features for developing an awareness of the operating conditions at said sensor and for selecting an appropriate branch classifying means to perform a classification.

10. A method of intelligently enhancing a physical security system, said physical security system being of the type having a sensor and a central control station, and wherein a communications device transmits an alarm signal to the central control station in response to an output state of the sensor, said method comprising:

connecting a modular processor unit between the sensor and the communications device;

receiving at the modular processor unit a signal from said sensor, said signal being reflective of a monitored event;

analyzing, at said modular processor unit, and over a period of time, a plurality of preselected features of said signal received from said sensor;

using said preselected plurality of features at said modular unit to evaluate a polynomial and using the evaluation thereof to classify said event reflected by said signal as an intrusion or a nuisance; and, simulating an element of said sensor from which said communications device expects to receive said sensor output state, said simulation being responsive to said classification for providing an output state in accordance with whether said event is classified as an intrusion or a nuisance.

11. The method of claim 10, wherein said signal from said sensor is an analog signal, and wherein said method further includes:

converting said analog signal from said sensor to a digital signal; and, analyzing said digital signal.

12. The method of claim 11, further comprising:

establishing a frequency cutoff with respect to said analog signal from said sensor;

establishing a sampling frequency at which said analog signal is sampled by analog to digital conversion means;

connecting said processor unit to a central downloading station; and, receiving downloaded parameters via said communication means and changing said frequency cutoff and said sampling frequency of said analog signal.

13. The method of claim 10, wherein said element from which said communications device expects to receive said sensor output state is a closure relay, and wherein said output state simulation means is a closure relay responsive to said classifying means.

14. The method of claim 10, wherein said communications device is a transponder.

15. The method of claim 1, further comprising archiving data associated with said event in memory means provided at said processor unit, including archiving of said features.

16. The method of claim 15, further comprising transmitting said archived data to a central data collection station.

17. The method of claim 10, wherein said analysis occurs over a predetermined time base, and wherein said features include the minimum value of said signal over said time base, the maximum value of said signal over said time base, the mean of the values of said signal over said time base, and the square of the standard deviation of said signal over said time base.

18. The method of claim 10, wherein said classifying step comprises:

using switch classifying means which uses preselected features for developing an awareness of the operating conditions at said sensor and for selecting an appropriate branch classifying means to perform a classification; and, using a selected one of a plurality of branch classifying means, each branch classifying means being preprogrammed to use preselected features in accordance with a particular different operating condition to classify said event reflected by said signal as an intrusion or a nuisance.

19. A modular processor unit for intelligently enhancing a physical security system, said physical security system being of the type having a plurality of sensors and a central control station, and wherein a communications device transmits an alarm signal to the central control station in response to an output state of the sensor, said processor unit being connected intermediate the plurality of sensor and the communications device and comprising:

receiving means for receiving signals from said plurality of sensors, said signals being reflective of events monitored by said sensors;

analyzing means for analyzing over a period of time a plurality of preselected features of each of said signals received from said sensors;

classifying means for using said plurality of preselected features to evaluate a polynomial and using the evaluation thereof to classify said events reflected by said signals as an intrusion or a nuisance; and, output state simulation means for simulating an element of each of said sensors from which said communications device expects to receive output affecting transmission of the alarm signal, said output simulation means being responsive to said classifying means for providing an output state in accordance with whether said events are classified by said classifying means as an intrusion or a nuisance.

20. The apparatus of claim 19, wherein said receiving means receives signals from a plurality of sensors, and wherein sensors in said plurality monitor differing monitored zones.

21. A modular processor unit in combination with a physical security system, the combination comprising:

a sensor for monitoring a monitored event and producing a signal reflective of the monitored event;

a central control station for receiving an alarm signal;

a communications device for transmitting the alarm signal to the central control station;

a modular processor unit connected to the sensor and to the communication device for using the signal produced by the sensor and for determining whether the monitored event is a nuisance or an intrusion, the modular processor unit comprising:

receiving means for receiving the signal from said sensor;

analyzing means for analyzing over a period of time a plurality of preselected features of said signal received from said sensor;

classifying means for using said plurality of preselected features to evaluate a polynomial and using the evaluation thereof to classify said event reflected by said signal as an intrusion or a nuisance; and, output state simulation means for simulating an element of said sensor from which said communications device expects to receive a sensor output state for generating the alarm signal, said output simulation means being responsive to said classifying means for providing an output state in accordance with whether said event is classified by said classifying means as an intrusion or a nuisance.

22. A modular processor unit in combination with a physical security system, the combination comprising:

a plurality of sensors for monitoring monitored events and producing sensor signals reflective of the monitored events;

a central control station for receiving alarm signals;

a plurality of communications devices for transmitting alarm signals to the central control station;

a plurality of modular processor units, each modular processing unit being connected between at least one of the plurality of sensors and one of the communication devices, each modular processing unit using the signal produced by said at least one of the plurality of sensors in connection with a determination of whether an event monitored thereby is a nuisance or an intrusion, each the modular processor unit comprising:

receiving means for receiving the sensor signal from said at least one of the plurality of sensors;

analyzing means for analyzing over a period of time a plurality of preselected features of said signal received from said at least one of the plurality of sensors;

classifying means for using said plurality of preselected features to evaluate a polynomial and using the evaluation thereof to classify said event reflected by said sensor signal as an intrusion or a nuisance; and, output state simulation means for simulating an element of said at least one of the plurality of sensors from which said communications device expects to receive a sensor output state for generating the alarm signal, said output simulation means being responsive to said classifying means for providing an output state in accordance with whether said event is classified by said classifying means as an intrusion or a nuisance;

a retraining station wherein the retraining station downloads classification-related parameters to the plurality of modular processing units on the communication network; and, a communications network connecting the retraining station to the plurality of modular processing units whereby information is transmitted between the retraining station and the plurality of modular processing units.

* * * * *